United States Patent
Kim et al.

(10) Patent No.: US 9,642,128 B2
(45) Date of Patent: May 2, 2017

(54) METHOD AND APPARATUS FOR PERFORMING DEVICE-TO-DEVICE COMMUNICATION IN WIRELESS COMMUNICATION SYSTEM

(71) Applicants: LG ELECTRONICS INC., Seoul (KR); SNU R&DB Foundation, Seoul (KR)

(72) Inventors: Hakseong Kim, Seoul (KR); Kwangbok Lee, Seoul (KR); Jongwoo Hong, Seoul (KR); Sunghyun Choi, Seoul (KR); Kyungsoo Kim, Seoul (KR); Seonik Seong, Seoul (KR)

(73) Assignees: SNU R&DB FOUNDATION, Seoul (KR); LG ELECTRONICS INC., Seoul (KR)

( * ) Notice: Subject to any disclaimer, the term of this patent is extended or adjusted under 35 U.S.C. 154(b) by 40 days.

(21) Appl. No.: 14/434,368

(22) PCT Filed: Oct. 8, 2013

(86) PCT No.: PCT/KR2013/009012
§ 371 (c)(1),
(2) Date: Apr. 8, 2015

(87) PCT Pub. No.: WO2014/058223
PCT Pub. Date: Apr. 17, 2014

(65) Prior Publication Data
US 2015/0282143 A1    Oct. 1, 2015

Related U.S. Application Data

(60) Provisional application No. 61/711,710, filed on Oct. 9, 2012, provisional application No. 61/752,445, filed
(Continued)

(51) Int. Cl.
*H04W 72/04* (2009.01)
*H04W 8/00* (2009.01)
(Continued)

(52) U.S. Cl.
CPC ....... *H04W 72/042* (2013.01); *H04L 43/0864* (2013.01); *H04L 45/7453* (2013.01);
(Continued)

(58) Field of Classification Search
CPC ..... H04W 92/18; H04W 4/08; H04W 72/042; H04W 76/021; H04W 76/046;
(Continued)

(56) References Cited

U.S. PATENT DOCUMENTS

2009/0017801 A1* 1/2009 Laroia ................. H04W 76/021
455/414.1
2009/0327391 A1* 12/2009 Park ...................... H04W 8/005
709/201

(Continued)

FOREIGN PATENT DOCUMENTS

KR    10-2013-0035964    4/2013

OTHER PUBLICATIONS

Fodor, et al., "Design Aspects of Network Assisted Device-to-Device Communications," IEEE Communications Magazine, Mar. 2012, pp. 170-177.
(Continued)

*Primary Examiner* — Paul H Masur
*Assistant Examiner* — Michael Phillips
(74) *Attorney, Agent, or Firm* — Lee, Hong, Degerman, Kang & Waimey

(57) ABSTRACT

The present invention provides a method and apparatus for performing device-to-device communication in a wireless communication system. The method includes generating identification information of a D2D user equipment that
(Continued)

supports the D2D communication as identification information for D2D discovery using a hash function, the identification information for discovery includes information of a first length for indicating a division region of the beacon signals and information of a second length included in the beacon. The information of a first length and the information of a second length are smaller than identification information of the D2D user equipment. Accordingly, by performing discovery for the D2D user equipment through the identification information having shorter length than prior art, and performing discovery in a range where the discovery is available through the region in which the beacon signals are allocated, advantages of performing the D2D discovery effectively are provided.

20 Claims, 19 Drawing Sheets

Related U.S. Application Data on Jan. 14, 2013, provisional application No. 61/752,917, filed on Jan. 15, 2013, provisional application No. 61/754,922, filed on Jan. 21, 2013.

(51) Int. Cl.

| | | |
|---|---|---|
| *H04L 12/26* | (2006.01) | |
| *H04W 4/08* | (2009.01) | |
| *H04W 74/08* | (2009.01) | |
| *H04L 12/743* | (2013.01) | |
| *H04W 40/24* | (2009.01) | |
| *H04W 48/16* | (2009.01) | |
| *H04W 76/02* | (2009.01) | |
| *H04W 76/04* | (2009.01) | |
| *H04W 88/08* | (2009.01) | |

(52) U.S. Cl.
CPC ............. *H04W 4/08* (2013.01); *H04W 8/005* (2013.01); *H04W 40/244* (2013.01); *H04W 72/0406* (2013.01); *H04W 74/0833* (2013.01); *H04W 76/021* (2013.01); *H04W 48/16* (2013.01); *H04W 76/023* (2013.01); *H04W 76/046* (2013.01); *H04W 88/08* (2013.01)

(58) Field of Classification Search
CPC ............... H04W 88/08; H04W 40/244; H04W 72/0406; H04W 74/0833; H04W 48/08–48/16; H04L 43/0864; H04L 45/7453

See application file for complete search history.

(56) References Cited

U.S. PATENT DOCUMENTS

| | | | |
|---|---|---|---|
| 2010/0157955 A1* | 6/2010 | Liu | H04W 72/0446 370/336 |
| 2011/0098043 A1 | 4/2011 | Yu et al. | |
| 2011/0235529 A1 | 9/2011 | Zetterberg et al. | |
| 2013/0028177 A1 | 1/2013 | Koskela et al. | |
| 2013/0083753 A1* | 4/2013 | Lee | H04W 72/0453 370/329 |
| 2013/0083779 A1 | 4/2013 | Ahn et al. | |
| 2013/0250771 A1 | 9/2013 | Yu et al. | |
| 2013/0288668 A1 | 10/2013 | Pragada et al. | |
| 2014/0056220 A1 | 2/2014 | Poitau et al. | |
| 2014/0082185 A1* | 3/2014 | Abraham | H04W 24/00 709/224 |
| 2015/0111587 A1* | 4/2015 | Kalhan | H04W 72/04 455/450 |
| 2015/0131749 A1 | 5/2015 | Slomina et al. | |
| 2016/0112858 A1* | 4/2016 | Nguyen | H04W 8/005 370/329 |

OTHER PUBLICATIONS

Doppler, et al., "Advances in D2D Communications: Energy efficient Service and Device Discovery Radio," IEEE, Mar. 2011, 7 pages.

PCT International Application No. PCT/KR2013/009012, Written Opinion of the International Searching Authority dated Dec. 31, 2013, 1 page.

U.S. Appl. No. 14/434,362, Office Action dated Jul. 19, 2016, 33 pages.

* cited by examiner

METHOD AND APPARATUS FOR PERFORMING DEVICE-TO-DEVICE COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/009012, filed on Oct. 8, 2013, which claims the benefit of U.S. Provisional Application No. 61/711,710, filed on Oct. 9, 2012, 61/752,445, filed on Jan. 14, 2013, 61/752,917, filed on Jan. 15, 2013 and 61/754,922, filed on Jan. 21, 2013, the contents of which are all hereby incorporated by reference herein in their entirety.

BACKGROUND OF THE INVENTION

Field of the Invention

The present invention relates to wireless communication systems, and more particularly, to a method and apparatus for performing device-to-device communication by verifying user equipment information in a wireless communication system.

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Meanwhile, in consideration of the requests of service provider that provides services to users, seek the benefit from the improvement of performances of the existing radio access or network and the way of recouping the investment costs for wireless communication systems which have been already invested so that the LTE system has been evolved in the form of maintaining or coexisting the compatibility with 2G communication system, which is the global system for mobile communications (GSM) based on the time division multiple access (TDMA), and with 3G communication system, which is the universal mobile telecommunication system (UMTS) based on the wideband code division multiple access (W-CDMA).

Particularly, with the advent of smart phones and tablet personal computers (PCs) recently, the users of actual communication devices require the services that enable you to easily obtain or share the information desired at any place and any time they want. However, it is not easy to effectively provide real-time information that is trivial but useful for users in real life situation due to the complexity of system or time delay of the wireless communication systems.

Meanwhile, a device to device (D2D) service, which is performed through a direct communication link among communication devices, without going through a network entity such as a base station, has emerged as an issue. This may be regarded that the wireless communication system is urgently needed to be developed/improved to support the environment in which users can share and obtain various information. In relation to this, the way and technique of effective data transmission and reception in wireless communication systems, which support the D2D service, are needed.

SUMMARY OF THE INVENTION

The present invention provides a method and apparatus for performing a direct device-to-device communication in a wireless communication system.

The present invention also provides a method and apparatus for obtaining user equipment information using hash function in a wireless communication system that supports a device-to-device (D2D) communication.

The present invention also provides a method and apparatus for decoding beacon signals including user equipment information in a wireless communication system that supports a device-to-device (D2D) communication.

In an aspect, a method for performing a device-to-device (D2D) communication service in a wireless communication system is provided. The method includes converting identification information of a user equipment that supports the D2D communication to binary codes, generating an identifier (ID) for a discovery comprised of bits having a length shorter than the identification information of the user equipment by applying a hash function to the converted identification information of the user equipment, configuring bits of a first length of a predetermined location among the bits of the discovery information to a beacon division region for transmitting beacon signals of the user equipment and configuring a predetermined bits of a second length to be included in the beacon signals, and transmitting and receiving the beacon signals including the bits of the second length in the beacon division region indicated by the bits of the first length.

In another aspect, an apparatus for performing a device-to-device (D2D) communication service in a wireless communication system is provided. The apparatus includes a radio frequency unit that transmits and receives radio signals, and a processor connected with the radio frequency unit, the processor is configured to perform: converting identification information of a user equipment that supports the D2D communication to binary codes, and generating an identifier (ID) for a discovery comprised of bits having a length shorter than the identification information of the user equipment by applying a hash function to the converted identification information of the user equipment, wherein the processor controls by configuring bits of a first length of a predetermined location among the bits of the discovery information to a beacon division region for transmitting beacon signals of the user equipment and configuring a predetermined bits of a second length to be included in the beacon signals, and transmitting and receiving the beacon signals including the bits of the second length in the beacon division region indicated by the bits of the first length.

Advantageous Effects

The present invention provides advantages of maximizing satisfaction of the service requests of each of the user equipments through a D2D communication link in the wireless communication environment in which a plurality of user equipments and communication devices coexist such as by guaranteeing data transmission and reception for a requested service by the corresponding user equipment. Accordingly, the present invention provides advantages of supporting overall system performance and requests for wireless data traffic which are abruptly increasing.

Particularly, the present invention provides advantages in performing decoding more rapidly and effectively than that of the prior art by verifying beacon signals including user equipment information in a beacon region of the user equipment. Therefore, the D2D communication provides advantages such as saving power and limited radio resources, shortening access time, saving frequency resource, and so on based on cellular network according to increase the proximity and efficiency of resource.

Figure 1:
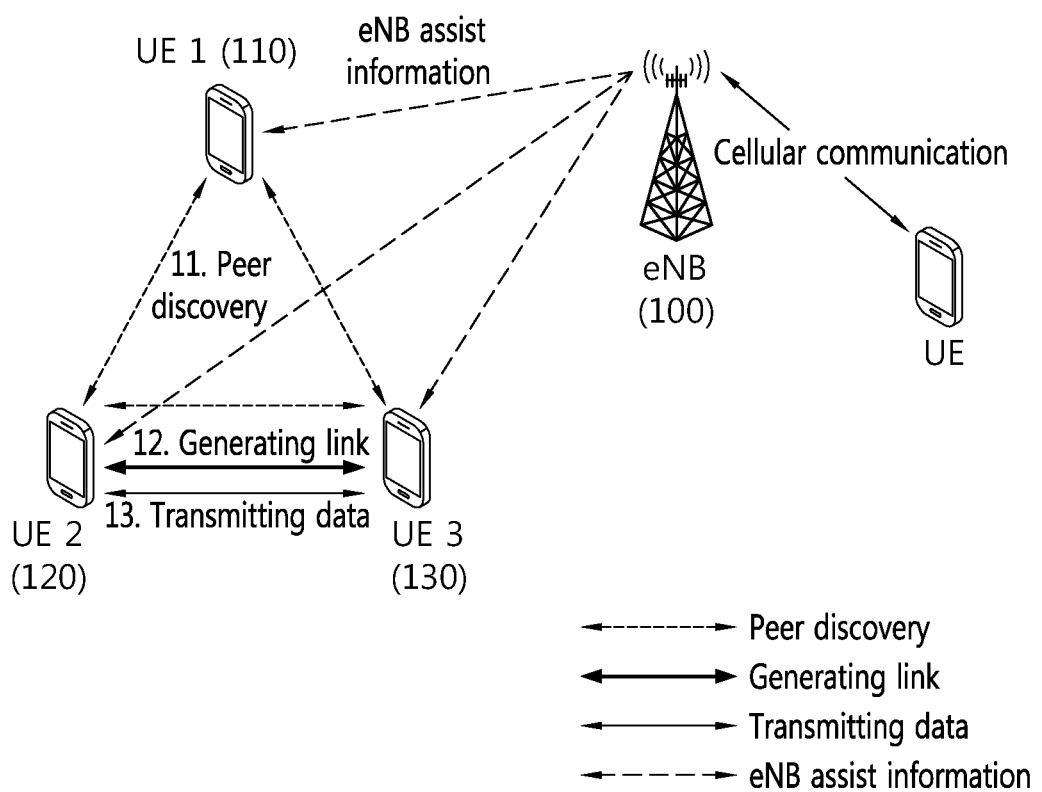
FIG. 1 schematically illustrates a structure of a wireless communication system to which the present invention is applied.

DESCRIPTION OF EXEMPLARY
EMBODIMENTS

Hereinafter, the preferred embodiment of the present invention now will be described in detail by reference to the accompanying exemplary drawings in this specification. In attaching reference numerals to elements in each drawing, it should be understood that the same reference numeral is used for the same element even if the element is shown in different drawings. In addition, in case that the detailed description for the related known elements and functions is determined to obscure the inventive concept in this specification, the redundant description for the same element will be omitted.

In addition, the present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

FIG. 1 schematically illustrates a structure of a wireless communication system to which the present invention is applied. The drawing depicts a network structure of evolved-universal mobile telecommunications system (E-UMTS). The E-UMTS system is also called long term evolution (LTE) or LTE-advanced (LTE-A) system, and refers to a packet based system to provide various communication services such as voice, packet data, and so on.

Referring to FIG. 1, the E-UTRAN includes an evolved-NodeB (eNB) 100 that provides a control plane and a user plane for user equipments (UEs) 110, 120 and 130. The UEs 110, 120 and 130 may be fixed or have mobility, and may be called other terms such as a mobile station (MS), an advanced mobile station (AMS), a user terminal (UT), a subscriber station (SS), a wireless device, and the like.

The eNB 100 generally refers to a station that communicates with the UEs 110, 120 and 130, and may be referred to with other terms such as a base station (BS), a base transceiver system (BTS), an access point (AP), a femto eNB, a pico-eNB, a Home NodeB relay, and so on. The eNB 100 may provide services for a UE through at least one cell. The cell may signify a geographical region that provides communication service by the eNB 100 or a specific frequency band, may signify downlink frequency resources and uplink frequency resources or may signify the combination of the downlink frequency resources and optional uplink frequency resources. The cell should be interpreted as inclusive meaning that it represents a partial region covered by the eNB 100. The cell may be defined as a mega cell, a macro cell, a micro cell, a pico cell, a femto cell, etc. according to size, with the term "cell" cell including all various coverage and regions according to the present invention.

Hereinafter, downlink refers to transmission link from the eNB 100 to the UEs 110, 120 and 130, and uplink refers to transmission link from the UEs 110, 120 and 130 to the eNB 100. In downlink, a transmitter may be a part of the eNB 100 and a receiver may be a part of the UEs 110, 120 and 130. In uplink, a transmitter may be a part of the UEs 110, 120 and 130, and a receiver may be a part of the eNB 100.

Various multi access methods may be used such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA in the present invention. In addition, as the uplink transmission and the downlink transmission, a Time Division Duplex (TDD) scheme transmitted using different times may be used. Or, a Frequency Division Duplex (FDD) scheme transmitted using different frequencies may be used.

Meanwhile, the physical layers applied to the present invention include a physical downlink control channel (PDCCH), a physical control format indicator channel (PCFICH), a physical hybrid ARQ indicator channel (PHICH), a physical uplink control channel (PUCCH), and so on.

Herein, the PDCCH may carry the resource allocation and the transmission format of a downlink shared channel (DL-SCH), the resource allocation information of a uplink shared channel (UL-SCH), the paging information on a PCH, the system information of the DL-SCH, the resource allocation of higher layer control message such as a random access response transmitted on a PDSCH, the set of transmission power control command for individual UEs in an arbitrary UE group and the activation of voice over internet protocol (VoIP), and so on. The PCFICH carries the number of OFDM symbol (i.e., size of control region) which is used for transmission of control channels in a subframe. The PHICH carries Acknowledgement (ACK)/Non-acknowledgement (NACK) signals which are the response signals to a Hybrid Automatic Repeat Request (HARQ) for the uplink transmission. The PUCCH carries the uplink control information such as the HARQ ACK/NACK for downlink transmission, the scheduling request, and a channel quality indicator (CQI).

Furthermore, in recent years, the mobile internet traffic has rapidly increased, and it is anticipated that such a trend will last for the time being. While overload of cellular communication network becomes serious due to the increase of mobile traffic, service providers try to solve the overload problem by introducing LTE, femto cell, wireless LAN, and the like. Such an effort has common ground of trying to decrease the overload of eNB by replacing and expanding infra. Meanwhile, as a method of decreasing the overload without replacing and expanding infra, the D2D communication that sends and receives traffic directly among UEs without infra has been magnified. Although the definition of such a D2D communication is not clearly established at the moment, the D2D communication may signify a direct communication among UEs without any infra of network systems. This signifies a communication that directly exchanges traffic among UEs not by introducing a small eNB such as a femto cell or a pico cell and nor by an eNB. Since such a D2D communication has an advantage in proximity compared with the existing communication through infra, for example, in the aspect of power transmission, if the distance among UEs is close, the communication is available in lower power than the case of exchanging traffic with an eNB located far away, which is more effective. The advantage enables the efficiency of limited radio resources to increase whereas the load of network infra to decrease. The efficiency of limited radio resources signifies that the frequency reuse factor may also be increased since the D2D communication is available in low power and several D2D links are available to communicate even in the same cell.

Particularly, since the D2D communication based on the cellular network has advantages such as power saving, shortening access time, saving frequency resource, and so on, various researches have been published. In addition, since the applications such as social network, mobile advertisement, short distance file transfer, etc. in which mobile traffic has been rapidly increased are considered as applications that are suitable for the D2D communication, basically the demand for D2D communication is anticipated to increase more in the future.

As shown in FIG. 1, such a D2D communication procedure may include a step of peer discovery 11 for searching neighboring D2D UEs in which the D2D communication is available, a step of link generation 12 for connecting a UE which is going to transmit data among D2D UEs found in the step of peer discovery 11 to a wireless link, and a step of data transmission 13 for transmitting traffic among the UEs connected with the wireless link. Although detailed procedure may vary according to actual D2D communication method, it can be said that the above three steps are general.

In more particular, the first step for D2D communication is the step of peer discovery 11. The step of peer discovery 11 is a step that each D2D UE searches other UEs that are available to perform D2D communication nearby. In this step, each of the UEs transmits search signals such that other UEs may find the UE and receives search signals transmitted from other UEs, and finds other UEs that are available to perform D2D communication are located within a range.

The second step for D2D communication is the step of link generation 12. In the step of link generation 12, a UE which is going to transmit data among D2D UEs found in the step of peer discovery 11 is linked to transmit data. Generally, the link is established when a UE sends a signal for requesting a link generation to other UE, the corresponding UE receives the signal and sends a response signal.

When a neighboring UE is found in the step of peer discovery and a link is established among the UEs that are going to exchange data in the step of link generation, the two UEs linked each other exchange data. This step is called the step of data transmission 13. Through the step, the UEs in which D2D link is established perform data transmission on predetermined time and frequency.

Such a D2D communication technique may be divided into a D2D communication based on the cellular network and a D2D communication that does not utilize infra of the cellular network in the least. The D2D communication based on the cellular network uses the information received from an eNB in the step of peer discovery and receives a help from the cellular network when performing resource allocation and power control when transmitting data for traffic transmission. This is more effective in power saving, access time, resource application, etc. that those of the D2D communication that does not utilize infra of the cellular network.

Meanwhile, a Peer discovery technique based on the cellular network may be divided into an A-priori peer discovery technique and an A-posterior peer discovery technique based on target UE to be searched. The A-priori peer discovery technique signifies a technique of performing search among the D2D UEs in which session is not setup. The A-priori peer discovery technique based on the cellular network signifies a way of searching UE using the broadcasting information of eNB and a technique of searching UE through register/request processes by a network entity, for example, a mobile management entity (MME). Hereinafter, this will be briefly described through FIG. 2 and FIG. 3.

Figure 2:
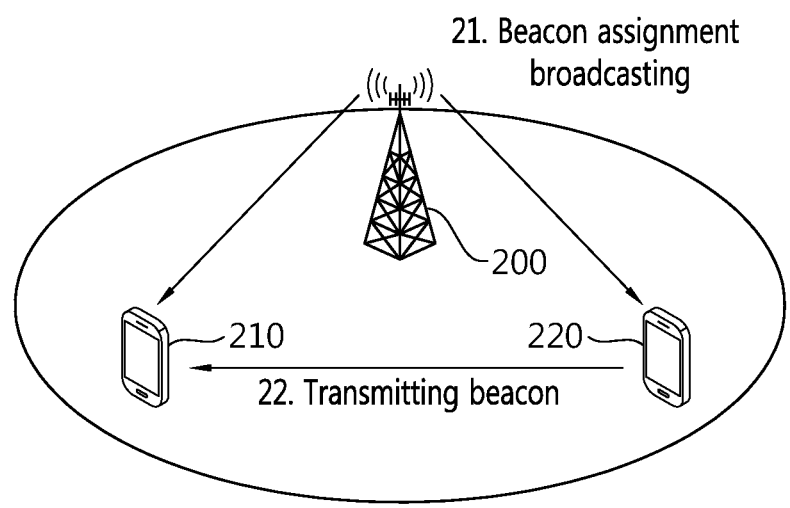
FIG. 2 schematically illustrates a peer discovery procedure using the broadcasting information in a wireless communication system to which the present invention is applied.

FIG. 2 schematically illustrates a peer discovery procedure using the broadcasting information in a wireless communication system to which the present invention is applied. This is one of the A-priori peer discovery techniques, and a method that UEs search each other using the broadcasting information of eNB will be described.

Referring to FIG. 2, an eNB 200 continuously broadcasts that each of the UEs 210 and 220 is allocated to which beacon resource to the D2D UEs (step, 21). Each UE is available to know the beacon allocated to itself based on the broadcasting information.

Each UE receives beacon assignments that are broadcasted from the eNB, and notifies the existence of the UE to other UEs by transmitting the assigned beacon through a predetermined communication resource (step, 22). Then, each of the UEs searches which D2D UEs are present nearby by searching beacon based on the information broadcasted by the eNB on the time when the beacon is not transmitted.

Figure 3:
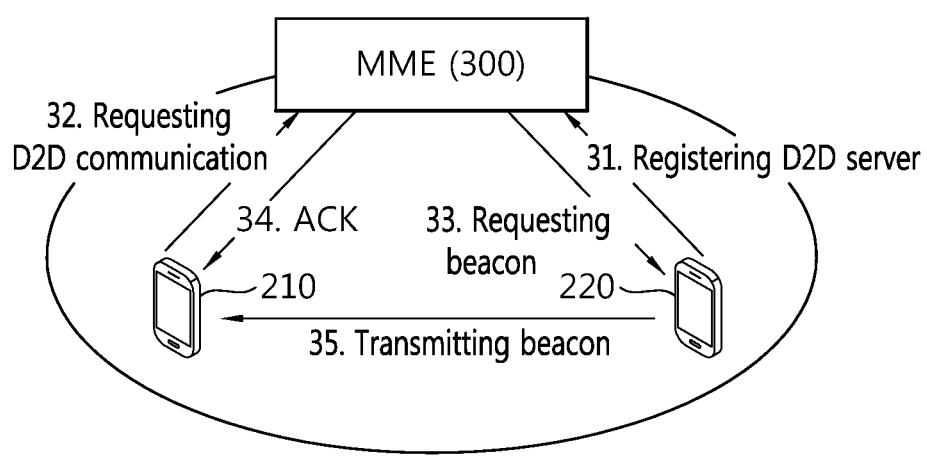
FIG. 3 schematically illustrates a peer discovery procedure using a network entity in a wireless communication system to which the present invention is applied.

FIG. 3 schematically illustrates a peer discovery procedure using a network entity in a wireless communication system to which the present invention is applied. This is one of the A-priori peer discovery techniques, and a method of searching UE through register/request processes to the network entity will be described.

Referring to FIG. 3, first, a server UE 220 that is going to send a beacon notifies an MME 300 that D2D communication is available and simultaneously registers its UE and service information (step, 31). When receiving a request from a client UE 210 that D2D communication is available, the MME 300 requests to send a beacon to the D2D server UE by verifying if there is a server UE to communicate with the corresponding client UE based on the information of a registered server UE (steps, 32 and 33). The server UE sends the requested beacon and the client UE receives this such that the D2D search procedure is available (steps, 34 and 35). The MME has access information of a UE or information of a UE's capacity, the information is primarily used for mobility management of a UE. The method of FIG. 3 provides more information during the peer discovery procedure than the method of FIG. 2, and thereby the UEs may save resources consumed in peer discovery.

Meanwhile, the A-posteriori peer discovery technique signifies a technique that each UE performs the peer discovery by targeting the UE existed in the same eNB among different UEs having a session which is already generated. That is, in the A-posteriori peer discovery technique, the peer discovery is, different from the A-priori peer discovery technique of searching arbitrary UEs nearby, a process of verifying whether there is a UE, which already has a session, located within a range where D2D communication is available with its own. In this reason, the A-posteriori peer discovery technique includes a method of using token and a method of analyzing internet protocol (IP) address according to a method of determining if two UEs that have a session exist in the same eNB. Hereinafter, this will be described through FIG. 4 and FIG. 5.

Figure 4:
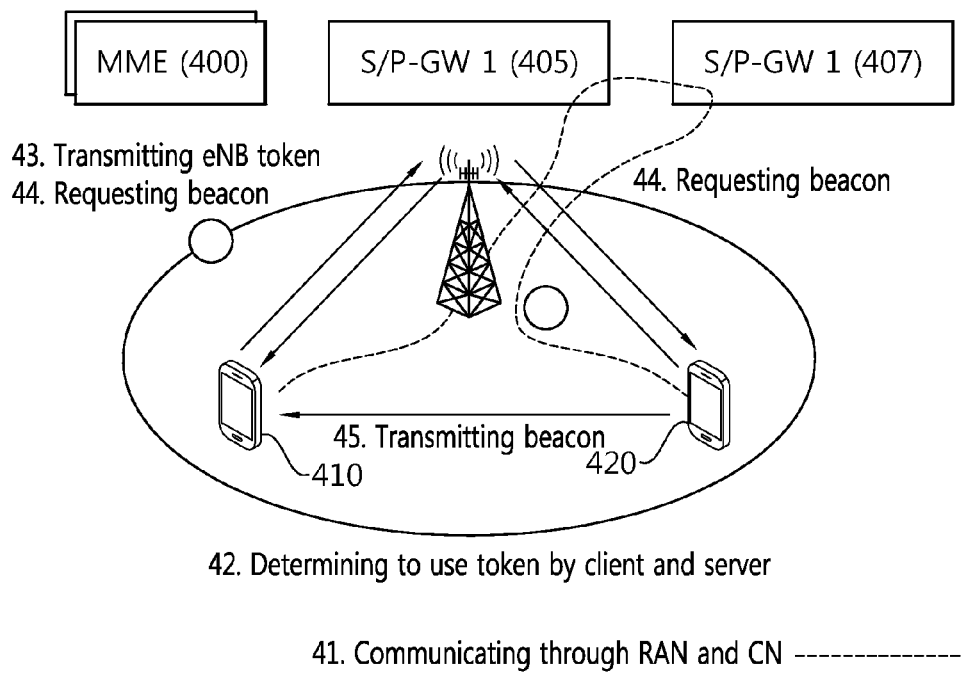
FIG. 4 schematically illustrates a peer discovery procedure using a token technique in a wireless communication system to which the present invention is applied.

FIG. 4 schematically illustrates a peer discovery procedure using a token technique in a wireless communication system to which the present invention is applied.

Referring to FIG. 4, the search technique using the token is a method of determining whether there exist two UEs that have a session in the same eNB using a distinctive token which is distinguishable by the eNB. When the UEs 410 and 420 that have a session, that is, the UEs that perform a communication through a radio access network (RAN) and a core network (CN) (step, 41) exchange tokens using the session of communication, the eNB may know the two UEs that have a session are in the same eNB by distinguishing the tokens (step, 42). If it is determined that two UEs are in the same eNB, the eNB requests one UE to transmit a beacon (step, 43) and requests another UE to receive the beacon (step, 44). If the beacon is properly received (step, 45), two UEs successfully complete the peer discovery and are determined to be located in the range where the D2D communication is available.

Herein, according to LTE system, the combination of E-UTRAN and EPC is called an evolved packet system (EPC), and the traffic flow that is ranged from all of wireless links through which the UEs 410 and 420 access the eNB to a packet data network that is connected to a service entity may be operated based on internes protocol (IP). An S-GW is a gateway having an endpoint of E-UTRAN, and a P-GW is a gateway having an endpoint of a packet data network. Through this, the flow of packet traffic of UEs is controlled by start/end. Thus, an MME 400 exchanges operation and management (OAM) information for supporting movement of UEs 510 and 520 with S-GW 505/P-GW 507 through S1-U. Through this, the flow of packet data according to movement of UE is controlled.

Figure 5:
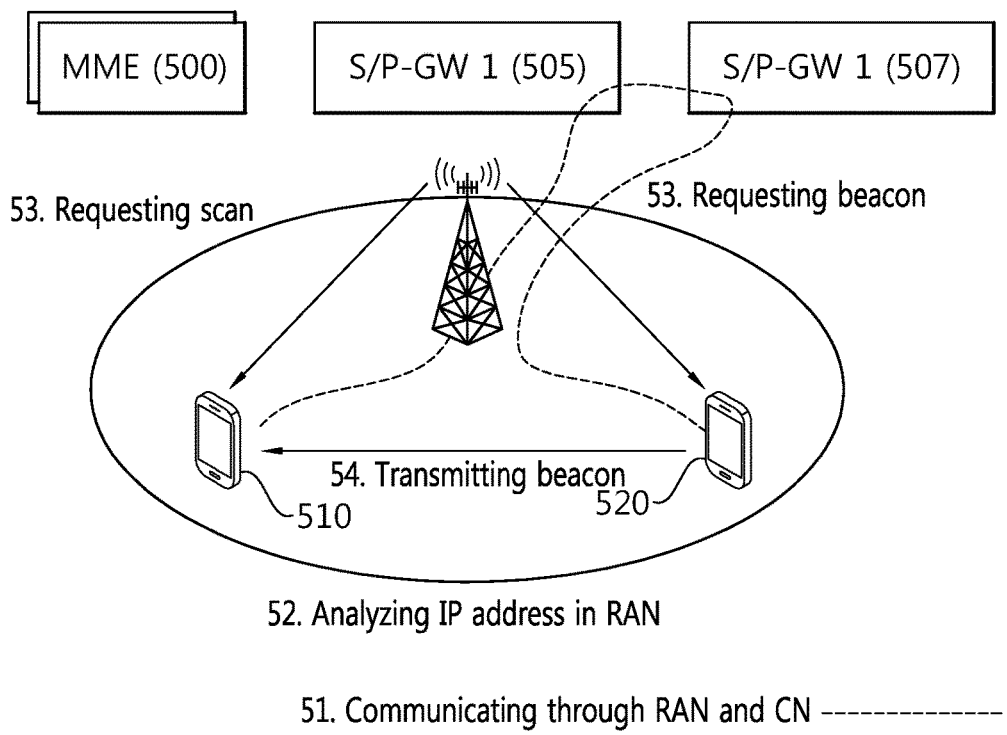
FIG. 5 schematically illustrates a peer discovery procedure considering an internet protocol address in a wireless communication system to which the present invention is applied.

FIG. 5 schematically illustrates a peer discovery procedure considering an internet protocol address in a wireless communication system to which the present invention is applied.

Referring to FIG. 5, a search technique using IP address analysis is a method of verifying if a transmission UE and a reception UE are in the same eNB by analyzing an IP address of a session. For the UEs that has a session generated (step, 51), that is, for the UEs that perform communication through the RAN and the CN, if two UEs are determined to be in the same eNB through the IP address analysis in S/P-gateway (GW), like the method of using tokens, the eNB requests one UE to transmit a beacon and requests another UE to receive the beacon (step, 53). If the beacon is successfully received, it is determined that the peer discovery is successful and the D2D communication is available (step, 54).

Hereinafter, in the present invention, in particular, a search technique based on the peer discovery technique that performs the peer discovery by directly exchanging beacons among UEs by an eNB as shown in FIG. 2 will be described in more detail. For a wireless communication system according to the present invention to which the LTE system is applied, it is going to propose a way for D2D peer discovery that is optimized for the resources used by an eNB. For this, a D2D peer discovery way and search protocol according to effective power use will be proposed based on the power problems, which may occur when many D2D UEs search through the eNB of LTE system. In addition, when performing the peer discovery utilizing an eNB, in order to solve the problem that a signaling overhead seriously occurs between eNB and UE, a peer discovery technique, which decreases the overhead between eNB and UE and also is good at peer discovery performance, will be proposed. Additionally, detailed ways will be proposed for a synchronization problem that may occur in the D2D peer discovery operation and beacon signals for search.

Meanwhile, a method for forwarding information of beacon during peer discovery procedure includes a method of transmitting peer discovery resources with all sorts of information (e.g., UE information) that corresponds to D2D ID being carried and a method of representing the D2D ID only by resource pattern through which beacon is transmitted, for example, FlashLinQ and Flash-OFDM. However, the method of transmitting all sorts of information that corresponds to D2D ID using beacon has shortcomings that the size is great and the load of searching peer that corresponds to the same group or pair is great. And the method of representing the D2D ID only by resource pattern may cause a problem that the numbers of D2D IDs which can be represented in limited time-frequency resources are very few.

That is, as described above, it is a core object to verify the UE information of UEs that are existed in the radius of D2D communication around the D2D UEs in the peer discovery procedure. The conventional methods to check the UE information mutually between the existing UEs can be divided into two methods mainly. The first method is performed such that the UE, which is going to do peer discovery, directly transmits and receives the UE information with the information being included in discovery signal. Bluetooth and Wi-Fi Direct perform peer discovery in this way. Since the number of discovery object UEs existed around is small in case of Bluetooth and Wi-Fi Direct, such a peer discovery technique is no problem to be adopted. However, in case of the peer discovery made between cellular devices, there exist many UEs nearby so that the method in which the UE information is directly transmitted and received is not appropriate in that the size of discovery signal, which is transmitted and received for the peer discovery, is big, and also the reception UE has to decode all the beacon signals received for obtaining the UE information of the UE that transmits the signal. On the other hand, the second method is to perform the discovery for the neighboring UEs after exchanging the UE information-beacon mapping information via eNB. As an example, the peer discovery technique, which used in FlashLinQ, belongs to it. In case of the second method that exchanges the UE information and the mapping information of beacon via eNB, it is efficient to learn the information of neighboring UEs around by using the mapping information broadcasted with only small-sized beacon in comparison with the first method, but there exists overhead to broadcast the mapping information periodically in eNB. Therefore, in consideration of those aspects of both pros and cons, detailed plans should be required for the D2D peer discovery.

In order to solve these problems, the present invention proposes a highly efficient peer discovery technique by improving the method which is related to the way of transmitting and receiving the UE information through a hash function in the existing peer discovery procedure. Particularly, the proposed technique of the present invention is an excellent peer discovery method as the overhead can be decreased between eNB and UE through hash design and protocol by introducing hash function, and the device discovery performance is also good, and so the hash function information only is broadcasted for the discovery instead of an individual UE information-beacon mapping information. That is, Each UE may learn the information about beacon that is transmitted by the relevant UE by using the UE information of the UE that is searched for through the broadcasted hash function, and by investigating the beacon accordingly, whether the UE, which is searched for, exists within the available range of D2D communication can be learned. This may drastically decrease the overhead due to the broadcast information that is transmitted from eNB in comparison with the existing discovery. Additionally it enables the discovery signal to exchange with small resource compared with the peer discovery in Bluetooth or Wi-Fi in which the UE information is to be transmitted or received with being included in the discovery signal. However, due to the multi-to-one characteristic that is represented in hash function, a verification process is required to check whether the UE that is transmitting the searched beacon is the correct UE that the UE itself is searching for. For this, in the present invention describes the peer discovery using hash function by dividing into mainly 4 categories of the UE information determination, hash function design, protocol design between eNB and UE, and security.

The present invention relates to a field of licensed band device to device (D2D) system based on LTE, and more particularly, to a method that enables an efficient discovery in terms of peer discovery resource and the reception of discovery signal by setting up the beacon partition according to D2D ID in the peer discovery procedure. Additionally, the present invention is to describe a peer discovery method using hash function for the efficiency, the security, and the personal information protection in connection with the use of D2D ID.

Figure 6:
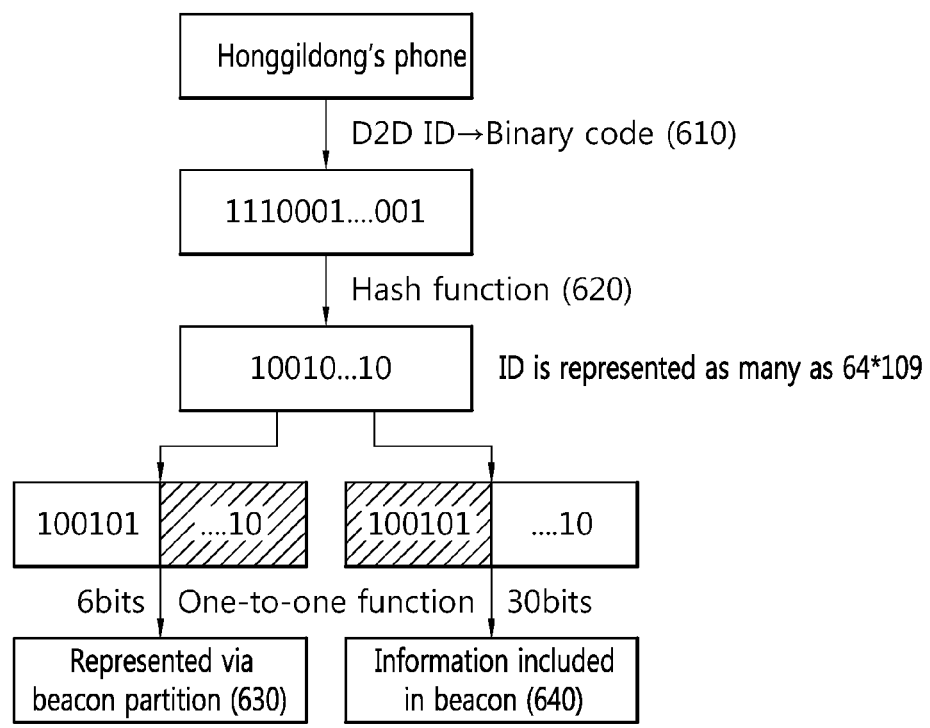
FIG. 6 schematically illustrates a concept of generating the UE information according to the present invention.

FIG. 6 schematically illustrates a concept of generating the UE information according to the present invention.

Referring to FIG. 6, the ID for the discovery of the peer discovery procedure is represented by dividing into 1) the partition of the beacon that is transmitted, and 2) the information that is included in the beacon. The beacon partitions are decided by dividing the whole sets of beacons that are applicable in an eNB with an equivalence partition (or unequal partition), and a part of bits of D2D ID should be represented by beacon partition(s). And the rest bits information of the above D2D ID is transmitted with directly being included in the beacon information.

That is, in the discovery ID generation method according to the present invention, in which beacon partition the UE information (device ID) is included has the information itself. The generation of D2D ID according to the present invention allows the beacon size to be decreased compared with the existing scheme, and accordingly it may have a merit to decrease the overhead of discovery signal. Additionally, by using the hash function broadcasted, a hash value, which corresponds to a peer (i.e., a pair or a group of the corresponding UE, a counter UE that is going to perform D2D communication) is obtainable, through a part of the above hash value, it is learned in which beacon partition the peer is existed, that means, it is not required to check the whole beacon but only check the beacon signals existing within the beacon partition obtained so that it results in drastically decreasing the whole number of beacons that must be search for.

Like this, the present invention may contribute to the following achievements. First, it may overcome such limits as the lack of beacon resources and the limit of beacon number that can be occurred in the peer discovery procedure of licensed band D2D system. Also, it allows the beacon size to decrease, and so the overhead of discovery signal may decrease in the discovery procedure for neighboring UEs. Lastly, by applying the multi-to-one mapping characteristic, which is a specific characteristic of a hash function for setting up the beacon partition, which refers to a hybrid method in which the UE information is represented by the resource location of beacon signal and the rest are transmitted with being included in the beacon itself. Through the hybrid method above described, an efficient transmission and reception of beacon is available in the D2D peer discovery procedure of a licensed (or non-licensed) band To describe FIG. 6 in more detailed, a random UE and the information of the D2D UE subscriber are converted to a binary code 610. The UE information is an identification that is used for representing the user (UE) itself and may refers to D2D ID. The information that is used as the D2D ID may include A. Email address, B. Mac address, C. Telephone number, D. D2D dedicated ID and so on. It refers to the device information or the UE information, and may include the international mobile subscriber identity (IMSI).

The UE information is converted to the ID for the peer discovery of D2D service through the hash function 620. In case that the D2D ID is converted to a binary code, each UE information is represented by hash value using the hash function that has a one-way characteristic and the obtained hash value is used for the signal transmission of the peer discovery.

As an example, the UE information (device ID) of 111001 . . . 01001 can be converted to the hash value of 100101 . . . 10 by using the hash function. That is, the hash value of 100101 . . . 10 obtained through the hash function is represented as $64 \times 10^9$ discovery IDs. By using the partial bits of the hash value obtained from the UE information (device ID), it is determined which beacon partition the relevant device information belongs to. Such a procedure refers to a domain setup procedure or a partition setup procedure 630.

Here, as the transmission of beacon signal is available for synchronous discovery in a licensed band, which is different from a technique of a non-licensed band (for example, Wi-Fi direct, Bluetooth), resource assignments is available in a grid-shaped in the peer discovery procedure. It is because beacon is a radio communication resource that is repeated on a regular cycle for the transmission of peer discovery signal so that the corresponding beacon partition divides the whole set of the beacon into a fixed/variable size and may be a subset of the divided whole beacon. Considering the above mentioned, in the peer discovery according to the present invention, the relevant UE information (device ID) can be searched for by using a domain setup procedure according to the partitioning of beacon domain.

In the present invention, as an example, the front 6 bits are used as the value for the beacon partition among the obtained hash values and the rear bits of predetermined length are transmitted with being included in the beacon signal 640. That is, the D2D ID, which is transmitted with belonging to a beacon partition, has the information itself. As an example of the present invention, 36 bits (hash value) may be represented as 6 bits beacon partitions and 30 bits beacon signal (carried by the beacon). Therefore, the ID generation through the hash function according to the present invention, has an advantage that is free from the problems in aspects of the security and privacy caused by a large number of bits that is required for representing the existing D2D ID or in case that the D2D ID is delivered as it is.

Figure 7:
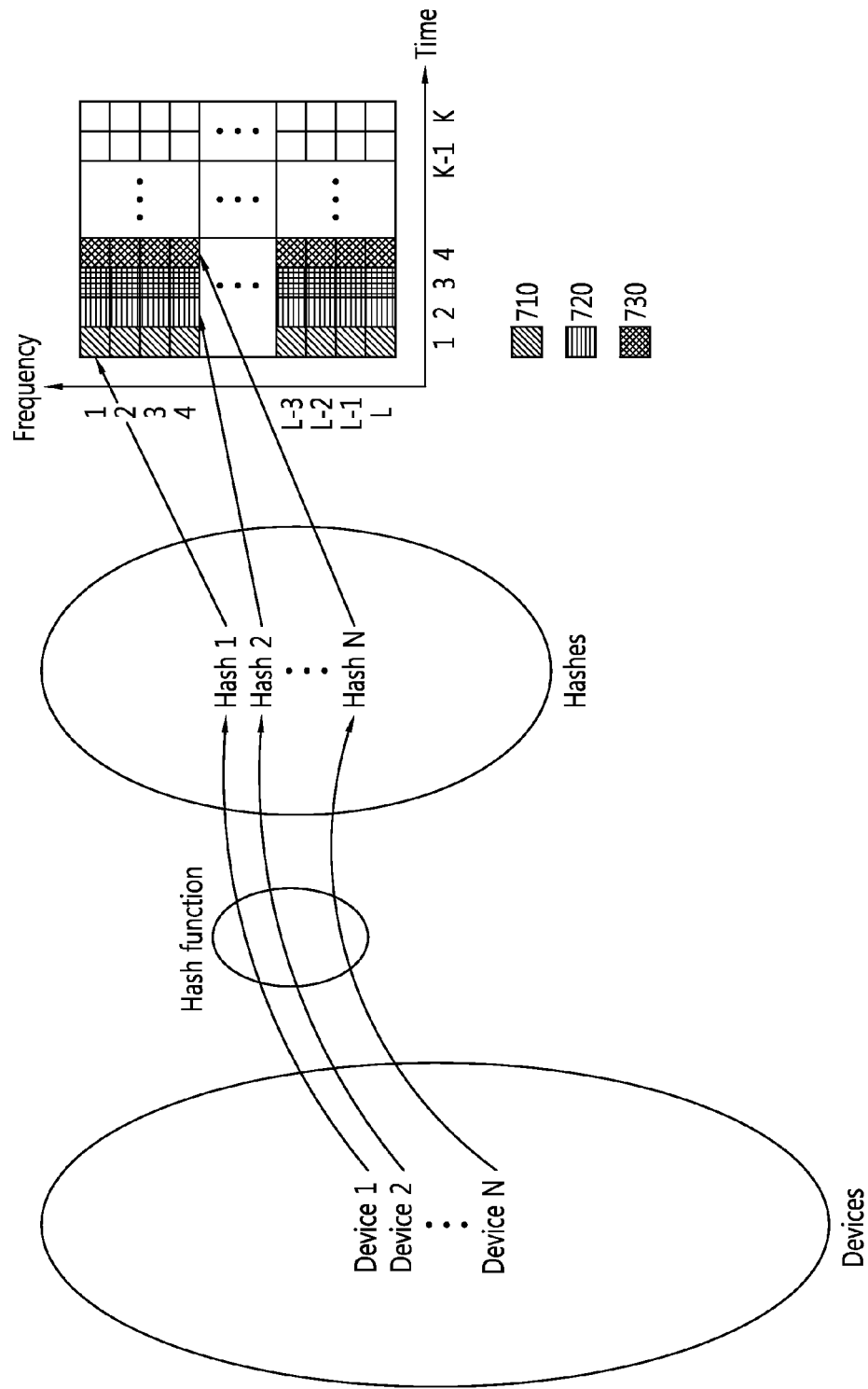
FIG. 7 to FIG. 10 illustrates schematically the mapping relation between the UE information and the beacon signal.
Figure 8:
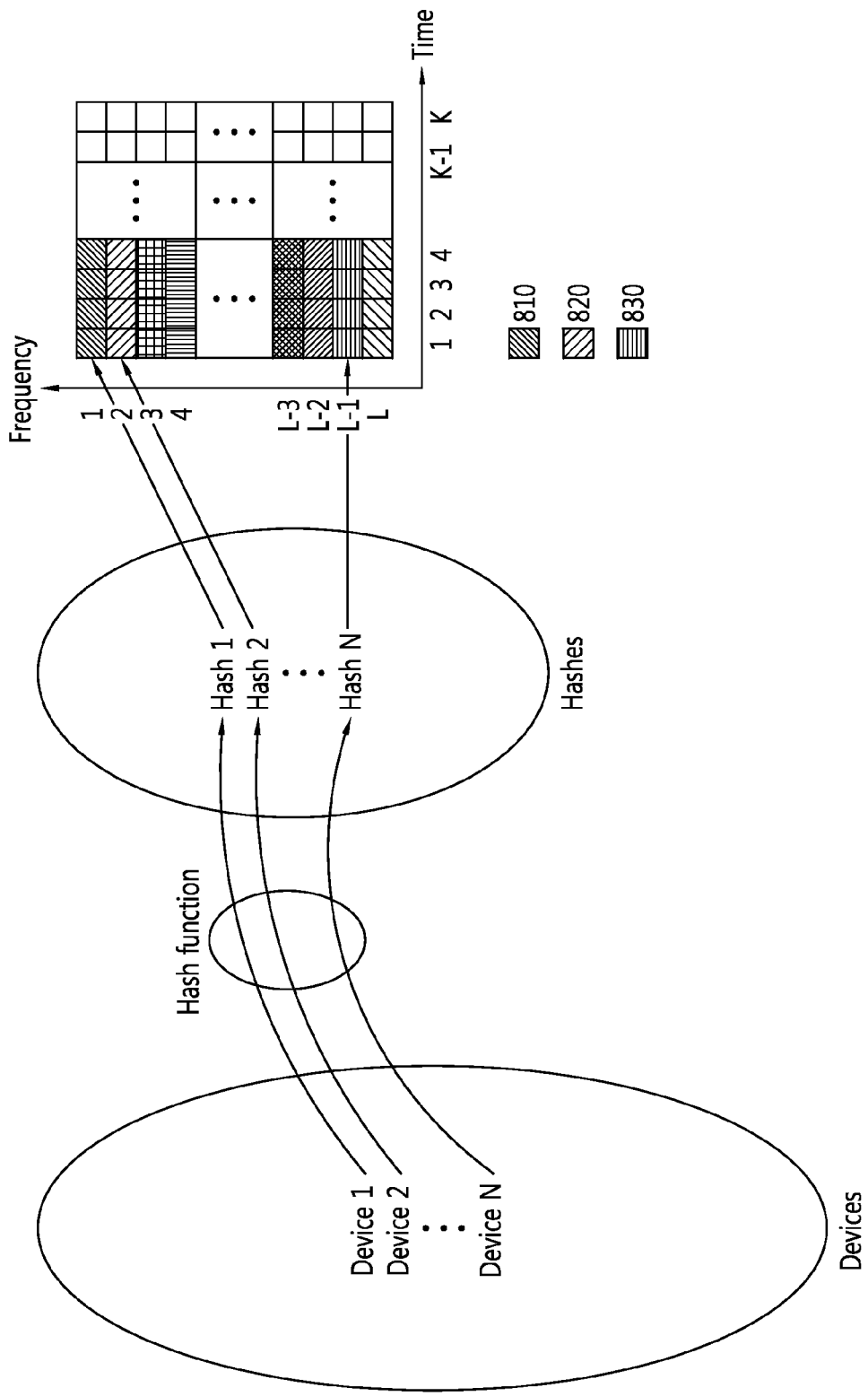
Figure 9:
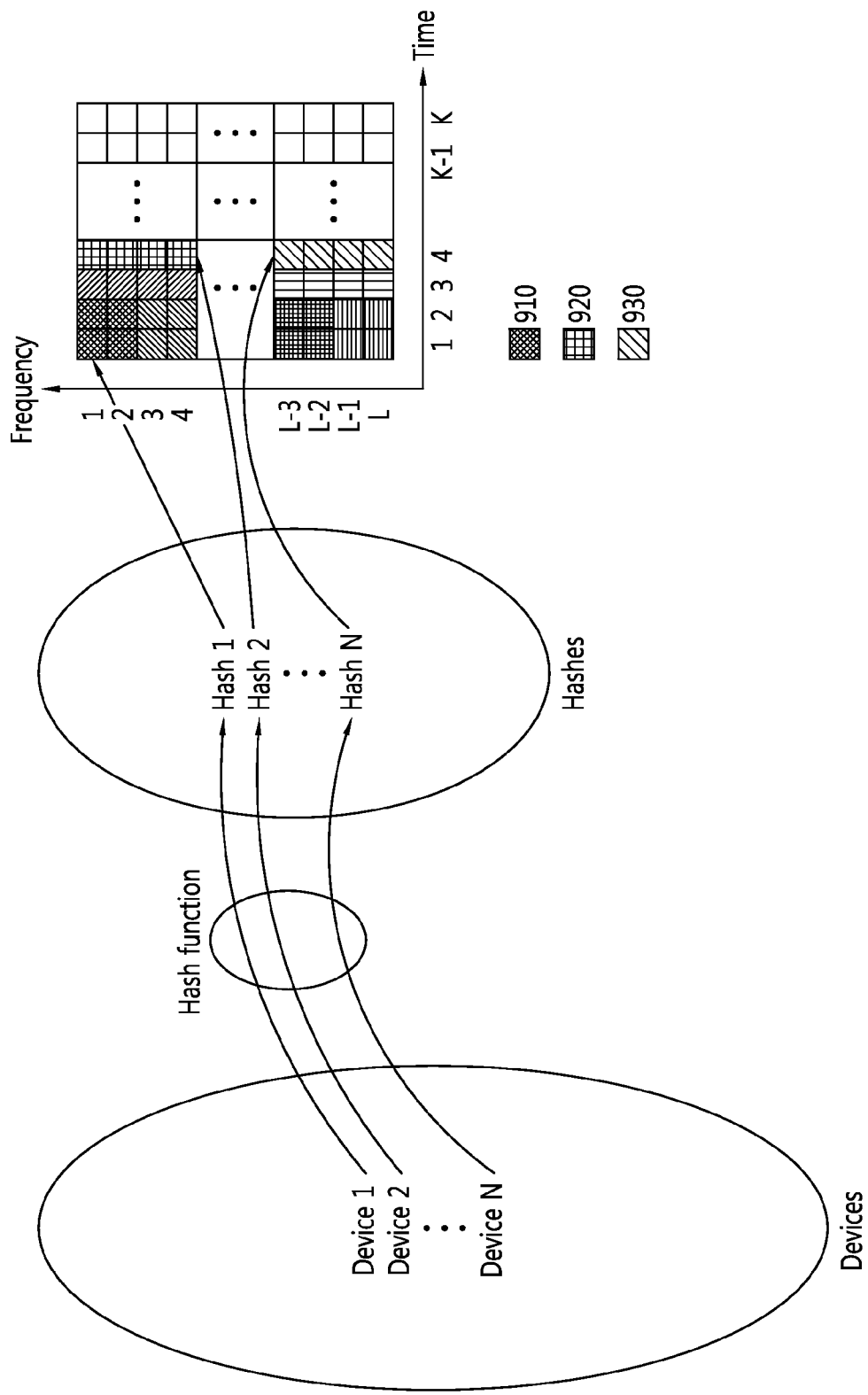

In relation to this, FIG. 7 to FIG. 10 illustrates schematically the mapping relation between the UE information and the beacon signal. For example, FIG. 7 illustrates the hash function used within a cell, is applied for a domain setup according to the time resource (A. Time partitioning) in setting up the beacon partition, and FIG. 8 illustrates a domain setup according to the frequency resource (B. Frequency partitioning). And FIG. 9 illustrates a domain setup according to the time-frequency resources (C. Time-Frequency partitioning).

Figure 10:
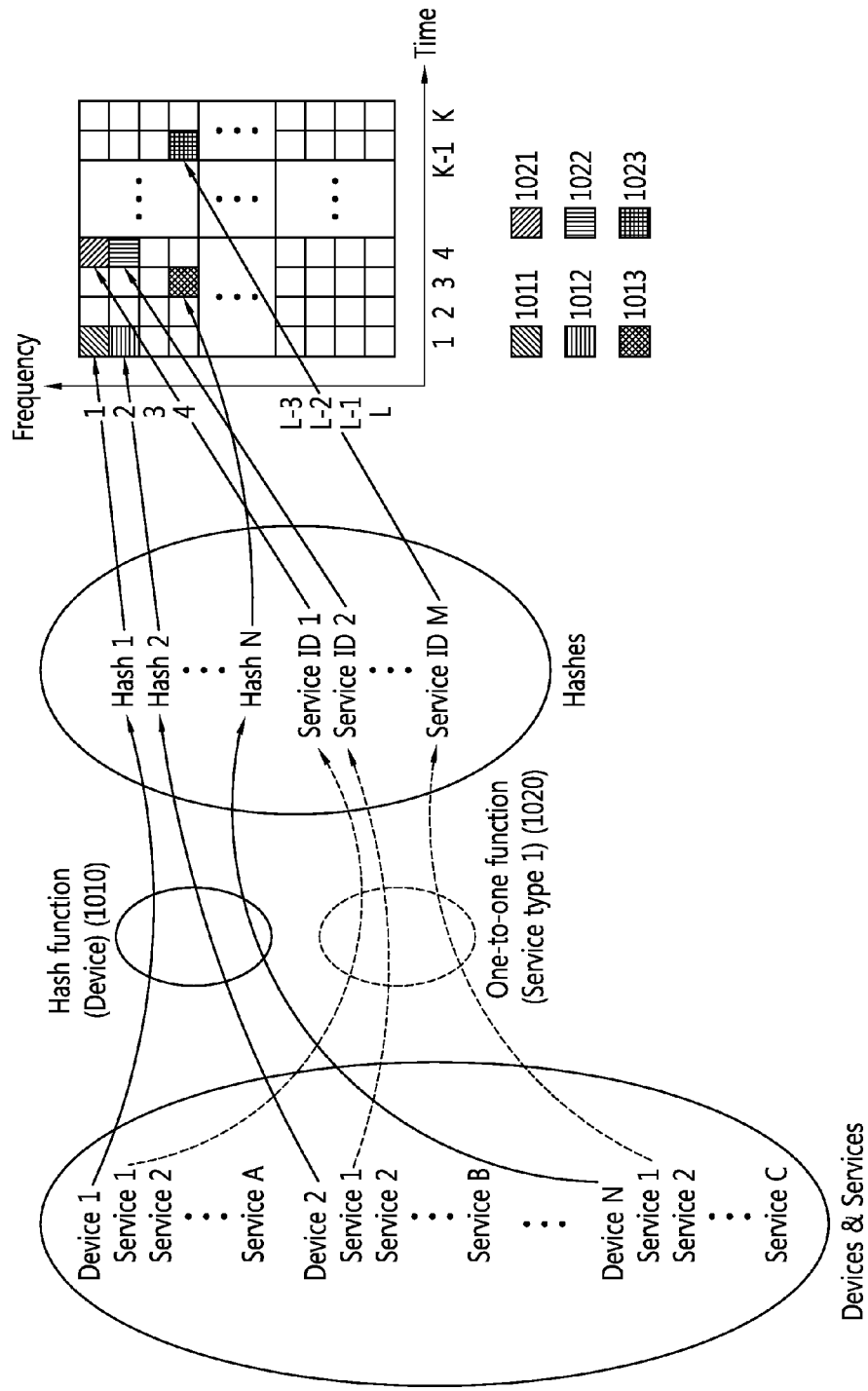

Referring to FIG. 7, the beacon partition is made by the time axis. Such a partitioning method, as shown in FIG. 8 to FIG. 10, can be extended to the domains of frequency, space, and code.

Here, each pattern refers to a different beacon partition 710, 720, 730, . . . 7N0. In a random beacon slot according to time (1, 2, 3, . . . K), it is an example that the whole frequency domain is represented identically, it can be represented such that the relevant partitions are set up over a part, or one or more time domains according to the usages of service and system. For example, FIG. 7 illustrates beacon partition #1, beacon partition #2, . . . beacon partition #N in the time sequence.

According to it, the UE information (device ID) that goes through the hash function is mapped to a hash value, and partial information of the hash value is represented to be located in a beacon partition. As an example, in case that the hash value of a UE is 000001 10011010(2)→000001(2), that is to say, it is set up in the first beacon partition 710. And, the bits left in being represented as beacon partition among the information of the hash values, are transmitted with being included in the corresponding beacon signal.

Referring to FIG. 8, the beacon partition is divided by frequency. Each domain on the frequency axis refers to a different beacon partition. On the frequency axis, 1, 2, 3, . . . , L are allocated to beacon partition #1, beacon partition #2, . . . beacon partition #N in order respectively (810, 820, 830, . . . 8N0). For example, in case that a hash value is N, (110011110110110), →11011, that is, $51^{st}$ beacon partition (located in L-$1^{th}$) 830. And, the bits left in being represented as beacon partition among the information of the hash values, are transmitted with being included in the corresponding beacon signal.

Referring to FIG. 9, the beacon partition is divided in a fixed size without distinction of time or frequency. Here, the size may vary depending on the usage. A specific value may be prioritized. In case that a specific value has a priority or specific characteristic, the resource partition can be a different size. In FIG. 9, for example, illustrates a mixture example of a resource structure in which total 4 resource domain units form a square with each two units by frequency domain and time domain forms a square and a structure in which 4 consecutive resources in frequency domain. That is to say, for example, using a (time, frequency) coordinate representation, each partition may have a resource structure as {(1,1), (1,2), (2,1), (2,2)} 910 for beacon partition #1, {(4,1), (4,2), (4,3), (4,4)} 920 for beacon partition #2, and {(4,L), (4,L-1), (4, L-2), (4, L-3)} 930 for partition #N.

As described above, the partition may be variably decided according to the hash function applied to. Also, the hash function to which the present invention is applied, A. according to a method using a part of the most significant bit (MSB) of hash values, for example, it is applied for 10010110→100101→$37^{th\ b}$ eacon partition, or B. according to a method using a part of the least significant bit (LSB) of hash values, for example, it is applied for 10010110→010110→$22^{th\ b}$ eacon partition, or C. according to a method using a part of hash values randomly, for example, it is applied for 10010110→110110→$54^{th\ b}$ eacon partition.

FIG. 10 illustrates an example of setting up beacon partition in consideration of the UE ID and the service ID according to another embodiment of the present invention. In generating the discovery ID by using the D2D ID, it is generated considering the service of D2D UE.

As described above, the ID of its own (the UE information) which each UE delivers through beacon can be mainly divided into user ID and service ID. The UE ID refers to a globally unique UE or a unique identity of user. For example, a user's e-mail address, UE MAC address, telephone number, and D2D dedicated ID etc. can be used. Meanwhile, the service ID refers to the ID that is determined by the service that is provided by D2D and reflects the service that a UE is willing to receive. Here, the UE that uses a plurality of services is able to have a plurality of the service IDs accordingly. The service ID is going to be represented with various forms that are applicable for D2D communications.

Therefore, in the peer discovery procedure for the D2D communication, the user ID and the service ID can be mapped to beacon in the three ways below.

A. User ID—Using hash function
Service ID—Using one-to-one function
B. Service ID—Using hash function 1
Service ID—Using hash function 2
C. User ID+Service ID—Using hash function Here, the method A refers to a method for notice in the way that the user IDs of UEs existing within an eNB are mapped by using beacon and hash function and the service IDs are mapped by one-to-one to beacon independently. Meanwhile, in the method B, the user IDs of UEs existing within an eNB are mapped to beacon through hash function 1 (1011, 1012, . . . , 101N), and the service IDs are mapped to another beacon through another hash function 2, which is different from the hash function 1 (1021, 1022, . . . , 102M). The Method C refers to a method in which the user IDs and service IDs are integrated and mapped to beacon through a single hash function.

Among the three methods, methods A and B are operated in a perfect independently way in connection with user ID and service ID. On the other hand, method C is to decide beacon through a hash function by integrating the user ID and service ID that belong to one UE. Here, in relation to the method in which hash function is applied by the user ID and the service ID being integrated, the information about which service is wanted by the discovery UE should be recognized in advance.

Meanwhile, the hash function, as described above, is a multi-to-one function so that, in case of deciding a hash function arbitrarily, there can be occurred a collision that the same beacon is transmitted by the UEs that have different UE information. Therefore, hash function is required to be designed in order to minimize the possibility of a collision of beacons between different UEs in a method and designed in order not to occur the collision of beacons in the other method. To design the hash function in order not to occur a collision means that the hash function is designed such that a specific UE possesses a specific beacon ID through the information of the UEs existing within an eNB.

As an example, in the method that is allowed for a collision of beacons between different UEs, the UE information-beacon mapping is made through a plurality of hash functions. N different hash functions are chosen through a Universal hashing method. The UE to which a plurality of hash functions designed by Universal hashing are broadcasted from an eNB, decides the UE information-beacon mapping by applying different hash functions from the first to $N^{th}$ order according to the predetermined rules on a N cycle in the number of peer discovery.

For example, in case of using the first hash only, the two UEs in which a collision of beacon occurs surely have a hash in which beacon is not collided among the beacons determined through $2^{nd}$ to $N^{th}$ hash. Therefore a problem that occurs in case of using one hash may be solved, but due to the tradeoff according to it, the time for peer discovery is extended. In this reason, it is necessary to select a correct N. In case that such a hash function using the Universal hashing is applied to the UE information-beacon mapping, the peer discovery is performed as the procedure as shown in FIG. 11.

According to the present invention, an eNB may apply the hash function that determines the UE information-beacon mapping of each device for the UEs existed in the eNB. In this case, when considering the collision of beacons that the UE uses when designing the hash function, different ways from each other are available.

Figure 11:
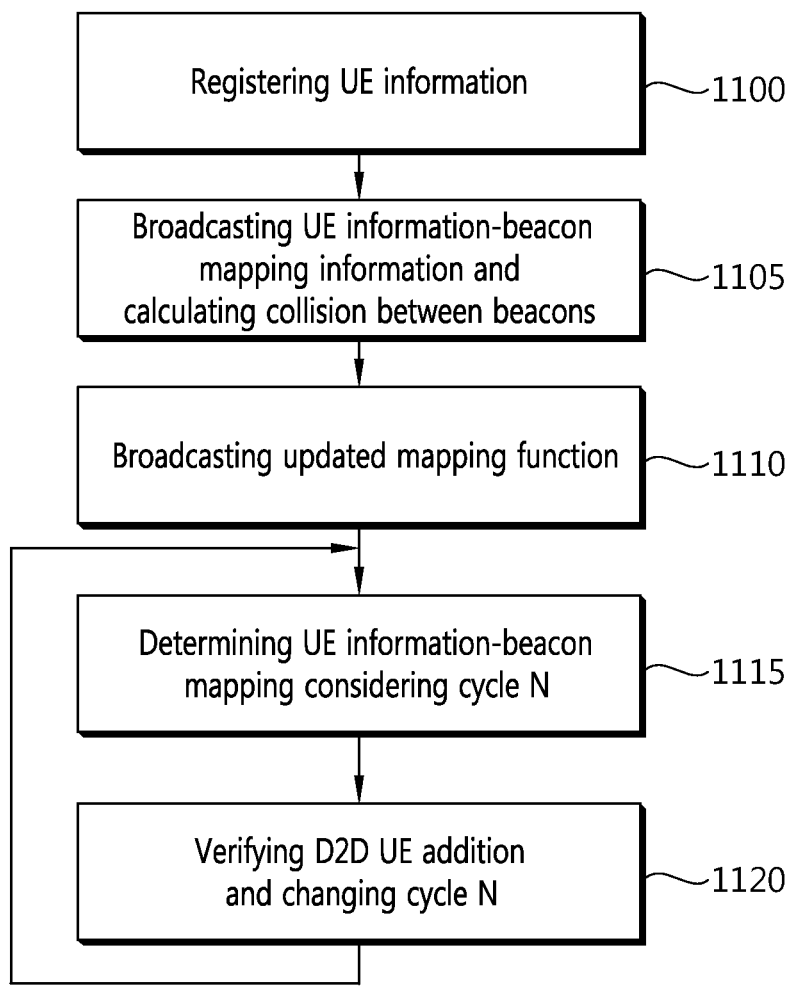
FIG. 11 illustrates the concept of generating beacon signals through the hash function using the UE information according to the present invention.

Hereinafter, FIG. 11 illustrates the concept of generating beacon signals through the hash function using the UE information according to the present invention.

Referring to FIG. 11, a UE registers the UE information in the eNB upon starting the D2D communication (step, 1000). The eNB broadcasts the UE information-beacon mapping information of the UEs within the eNB by using a single hash function, and calculates the collision between beacons (step, 1105). Herein, the eNB calculates the number of collisions occurred between the beacons by applying the single hash function within the eNB. This includes the determination whether the number of collided UEs of beacon calculated from the existing hash function applied, that is, the number of UEs collided between specific beacons exceeds a predetermined threshold value.

In the collision calculation process, the number of UEs that are collided between specific beacons exceeds the predetermined value, the eNB expands the number of hash function based on the Universal hashing, determines this as a new UE information-beacon mapping function, and broadcasts it to the UEs in the cell (step, 1110).

Herein, if H is assumed as a hash function set, as an example, the Universal hashing selects a subset among the H. The h function within H is configured to be $\{0, 1, \ldots, m-1\}$, in case that the available number of hash inputs is m, and such that the number of the hash functions of which hash value of an arbitrary two inputs is $|H|/m$, In case that the available number of hash inputs is m. Accordingly, the number of UEs that are collided in the beacons which is calculated from the existing hash function exceeds the predetermined value, the eNB adds the hash function based on the Universal hashing, and transmits this to the UEs in the cell.

Then, the UE to which the added mapping function is broadcasted decides the UE information-beacon mapping by applying different hash functions from the first to $N^{th}$ according to the predetermined rules on an N cycle in the number of peer discovery (step, 1115). That is, the number of UEs in each beacon is within the threshold value, the N hash functions are simultaneously used. Then, the eNB designates a region of hash value for each hash function allocated, and each UE determines the parallel connection of them to be a value for beacon transmission of its own.

Later, the eNB selects the proper N in case that a new D2D UE is included or the existing D2D UE stops the D2D communication, and repeats the procedure of step, 1110, in case that the value of selected N varies (step, 1120). That is, in case that that a new D2D UE is included or the existing D2D UE stops the D2D communication, the eNB determines whether to use the hash function based on a threshold point from the hash function which is added by $N^{th}$ order.

Through the procedure, the peer discovery in the D2D communication of the method that is not allowed for a collision of beacons between different UEs provides a perfect hashing by varying the cycle according to the collision calculation. Each UE registers the UE information to the eNB, and the eNB calculates the number of collision occurred between beacons. Accordingly, the perfect hashing technique adds and updates a second hash function such that no more collision occurs between the corresponding UEs by considering the collided UE in the corresponding value when the hash calculated by the existing hash function collides. In this time, the eNB regards the parallel connection of the hash values from the two or less than hash functions allocated for each UE as the hash value for beacon transmission of its own. Accordingly, in case that a new D2D UE is included or the existing D2D UE stops the D2D communication, the eNB tries to update the second hash function according to the hash value of the corresponding UE.

Accordingly, as described above, in the method that is allowed for a collision of beacons between different UEs, the object is to lower the probability of collision by using a plurality of hash functions allowing the collision of beacons, on the other hand, it is available to guarantee using different beacons for different UEs through perfect hashing. For this, the eNB continuously calculates the beacons of the UEs within the range of eNB and updates the existing UE information-beacon mapping by allocating additional hash function and resources for the UEs in which a collision occurs. Although this has a weak point in that the resource should be allocated relatively a lot for the peer discovery, the method has a strong point in that the collision between beacons can be perfectly prevented.

As described above, the design of hash function dynamically allocates the resources for beacon transmission most effectively according to change in entrance of UE to the cell, and considers minimization of physical (of time or frequency domain) mapping change of beacon for existing UE. In this time, if the collision between UEs is permitted, in order to guarantee the efficiency in resource use and the security by permitting collision of hash value within a cell, it is preferable to perform the perfect hashing as described in FIG. 11 but to apply N-level hashing with universal hash set, and it is preferable to apply the perfect hashing method that an eNB controls the hash value in order for the hash value within a cell not to collide in case of not permitting the collision.

Hereinafter, the procedure of performing the peer discovery through the hash function applied between an eNB and a UE.

Figure 12:
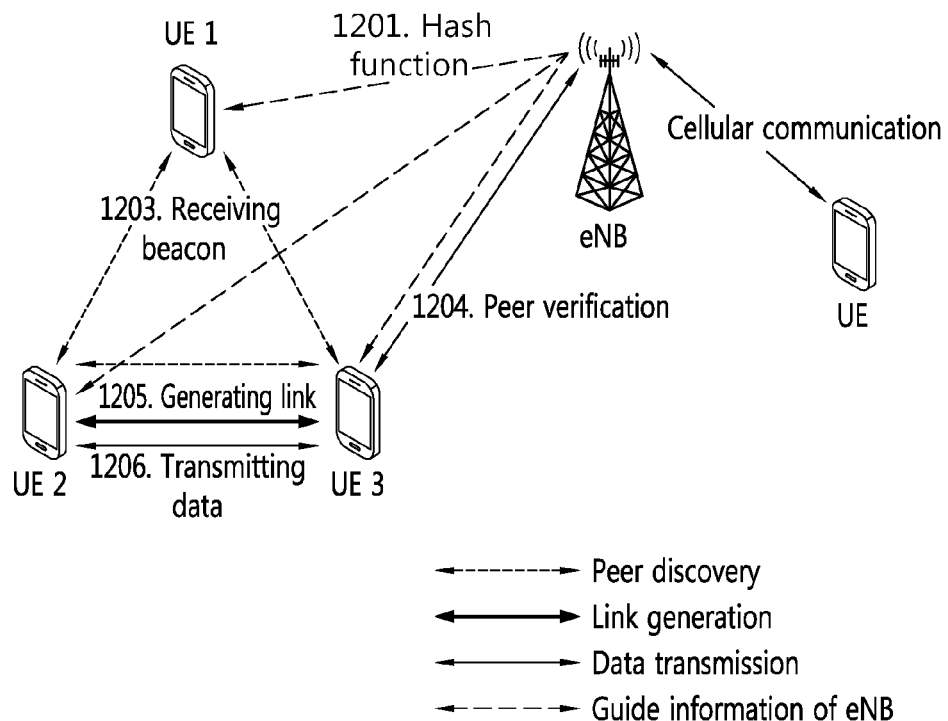
FIG. 12 is a flow chart illustrating a verification of D2D UE through an eNB according to the present invention.

FIG. 12 is a flow chart illustrating a verification of D2D UE through an eNB according to the present invention.

Referring to FIG. 12, first, a D2D UE receives information of hash function which is used within a cell area managed by an eNB from the eNB (step, 1201). The process of receiving the information of hash function may be performed for the peer discovery in the process of device registration procedure.

The UE calculates the beacon information of its own by using the broadcasted hash function and the unique UE information of its own (step, 1202). That is, the UE obtains a hash value by applying the UE information of its own to the hash function, and performs mapping by distinguishing a part of the obtained hash value into bits for beacon division region and information to be included in the beacon signals. An example of the bits for beacon division region for the D2D discovery refers FIG. 6 to FIG. 12 described above.

The UE transmits and receives the beacon signals generated by the predetermined UE information-beacon mapping in the hash beacon division region (step, 1203). This includes to transmit beacon of its own through the beacon information calculated in the step, 1202, and to receive the beacon transmitted by another UE.

Then, the UE checks whether there is a UE that has a possibility of existing a peer of itself among the beacon signals received using the hash function received from the eNB and the UE information of the peer UE (step, 1204). That is, in case of determining if there is possibility that the peer exists for peer verification, the UE checks whether the corresponding peer is the UE nearby through the eNB.

In case of receiving the peer verification from the eNB, that is, if it is verified that the peer is of its own, the UE forms a link with the corresponding UE (step, 1205).

Later, the UE performs the D2D communication with the peer of which the link is formed (step, 1206). Hereinafter, the flow of signaling for peer verification by the eNB described in FIG. 12 above will be described in more detail by reference to FIG. 13.

Figure 13:
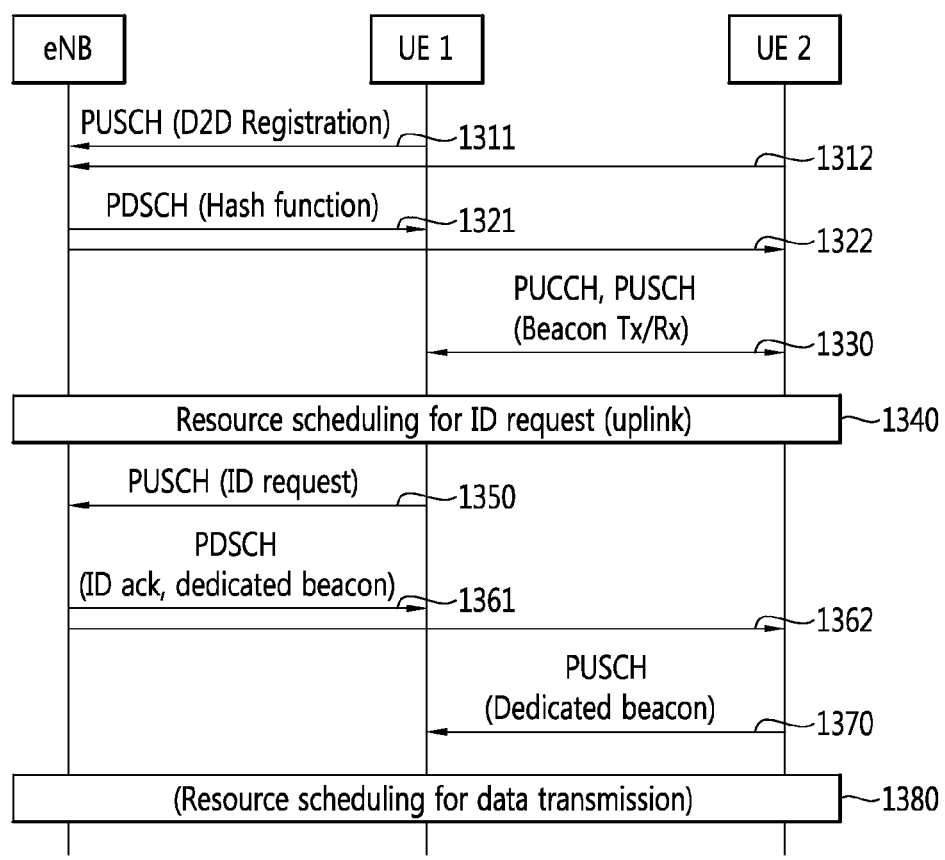
FIG. 13 is a flow chart of signaling that verifies a D2D UE according to FIG. 12 of the present invention.

FIG. 13 is a flow chart of signaling that verifies a D2D UE according to FIG. 12 of the present invention.

Referring to FIG. 13, each D2D UE performs a device registration process. This includes performing a registration process for the D2D communication of its own to an eNB through the existing cellular communication while each UE starts the D2D communication, and each UE performs the registration process via the PUSCH (steps, 1311 and 1312).

Each UE receives the beacon assignments which are broadcasted from the eNB. In this time, the UE receives the hash function which is broadcasted, and setup the beacon division region, which is divided region of time/frequency/time-frequency domain through the hash function and the data bits included in the beacon signals. And, each UE receives the hash function via the PDSCH (steps, 1321 and 1322). Accordingly, each UE acquires the beacon signals for transmitting the UE information of its own through the hash function which is broadcasted. That is, each UE performs the UE information-beacon mapping. In addition, each UE may also obtain the information whether the UE or the service that is going to communicate transmits from which beacon through the broadcasted hash function. The information of beacon which is obtained is utilized in the beacon transmission and reception step, which is the next step. The PDSCH further includes resource information of the PUCCH and the PUSCH for performing the D2D discovery.

Then, the D2D UEs transmit the beacon region information calculated through the hash function using the PUSCH and the PUSCH allocated through the beacon information of its own, and receive the beacon that another UE transmits (step, 1330). In the beacon transmission and reception, each UE transmits the beacon signals of its own in the peer discovery step based on the information of beacon obtained through the UE information-beacon mapping. In addition, each UE verifies the possibility that the UE or the service that is going to be searched is within a range where the D2D communication is available by receiving the beacon signals transmitted from a radius range where the D2D communication is available. That is, when verifying device proximity, each UE verifies the proximity of the corresponding UE through checking a specific beacon among the beacons received, and verifies that it is highly possible that the corresponding UE is the UE that is going to be searched since the corresponding UE is identical to the beacon of UE that is going to be searched. However, when designing the hash function for the UE information-beacon mapping, if a method that allows beacon collision between UEs different from each other is used, the UE is only available to know the possibility that the corresponding UE is the UE that is going to be searched, but is in the state that the UE is exactly the UE that is going to be searched.

In order to check this, the UE performs peer verification through the eNB (step, 1340). The UE preferentially verifies whether a UE that is going to be searched exists in a cell from the eNB. If it is verified that the corresponding UE exists, the UE may establish link formation by verifying the proximity of UE through the link process for direct D2D communication with the corresponding UE.

Accordingly, a certain D2D UE may perform a resource scheduling process for requesting a discovery ID in order to perform verification of its own peer (step, 1340). Then, the UE verifies whether a certain UE (for example, UE1) is a possible UE via the PUSCH, that is, a peer is the UE nearby in order to verify a peer of the UE. In this time, the PUSCH transmits a link configuration request message including an ID of the peer UE that has verified possibility through the hash function to the eNB (step, 1350).

Then, the eNB transmits the PDSCH with response information of affirmative/negative to the ID and dedicated beacon information for link formation with the peer UE being carried to UE1 (step, 1361). That is, if it is determined that the UE corresponding to the ID received from the eNB exists within the eNB, the eNB allocates the affirmative signal to this and the resource for performing link configuration to the corresponding two UEs, and transmits this via the PDSCH. And, if the corresponding UE does not exist in the eNB, the eNB transmits the PDSCH that includes fail response information to the ID.

In this time, for the link formation, the eNB may transmit the information of the dedicated beacon to the UE2, which is a peer UE (step, 1362).

Then, UE2 transmits the received dedicated beacon assignment information to UE1, and UE1 and UE2 transmit and receive data using the dedicated beacon which is assigned (step, 1370). In this time, the UEs may perform the data transmission and reception by receiving resource scheduling for data transmission (step, 1380).

Figure 14:
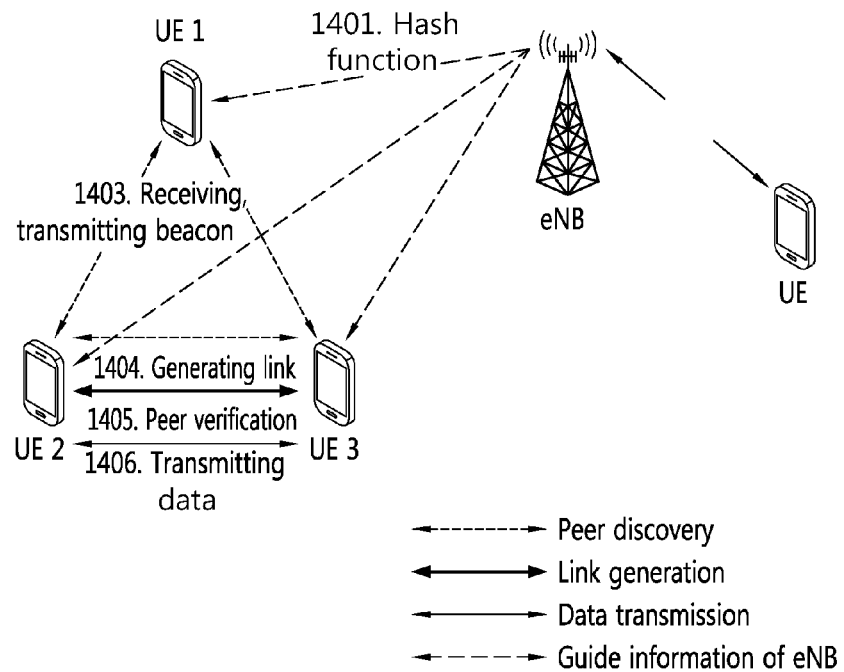
FIG. 14 illustrates an example of searching and verifying UE directly between UEs according to the present invention.

FIG. 14 illustrates an example of searching and verifying UE directly between UEs according to the present invention. This is a method of directly verifying peer between UEs.

Referring to FIG. 14, the D2D UE receives information of the hash function used in a cell area managed by an eNB from the eNB in order to the peer discovery (step, 1401).

The UE calculates the beacon information of its own by using hash function and the unique UE information of its own (step, 1402). That is, the UE obtains a hash value by applying the UE information of its own to the hash function, and performs mapping by distinguishing a part of the obtained hash value into a beacon division region value and information to be included in the beacon signals. Information of beacon division region for the D2D discovery refers FIG. 6 to FIG. 12 described above.

The UE transmits and receives beacon signals of predetermined length through the calculated beacon information, that is, in the beacon division region determined according to the UE information-beacon mapping which is obtained by the hash function (step, 1403).

And, the UE forms a link with a UE that is possible to be a peer among the beacon signals which are transmitted and received (step, 1404). Then, preferentially, the UE directly exchanges message between UEs for security message exchange and examining link formation possibility with a UE that receives the corresponding beacon. Later, through the link process for D2D communication with the corresponding UE, the UE may also verify that the corresponding UE is the UE that is going to be searched. Then, the UE establishes link formation if it is verified that the corresponding UE is the UE that is going to be searched.

For this, the UE verifies that the UE in which the link is formed is a peer of its own (step, 1405). That is, the UE verifies whether there is possibility of existing its own peer among the received beacon by using the hash function received from the eNB and the UE information of peer UE.

Later, the UE performs the D2D communication with the peer of its own, to which the link is formed for the data communication (step, 1406).

The peer verification method between UEs described in FIG. 14 may further decrease the load of eNB in comparison with the peer verification method in FIG. 12 described above. Accordingly, the method is preferable in the aspect of effectively controlling the load of eNB in the communication environment where the cellular UE and the D2D UE coexist. For this, the hash function plays a role that allocates the beacons that are used within an eNB to each UE by using the globally unique UE information as a key. Since the number of beacons that are used within an eNB is limited in comparison to the globally unique UE information, hash function is used. Accordingly, the size of discovery signal according to the present invention has small bits, and thus, the overhead, which broadcasts the UE information and beacon mapping information periodically, can be drastically reduced.

Figure 15:
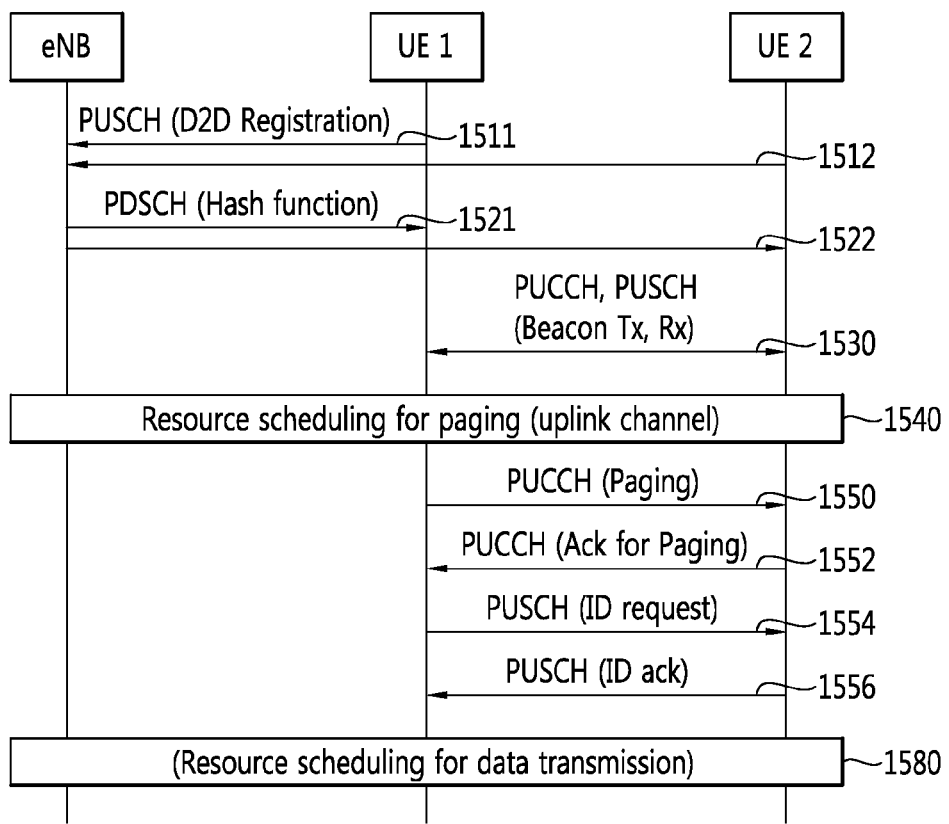
FIG. 15 is a flow chart of signaling that searches another D2D UE according to another example of the present invention.

FIG. 15 is a flow chart of signaling that searches another D2D UE according to another example of the present invention.

Referring to FIG. 15, a D2D UE performs a device registration process for its own D2D communication to an eNB through the existing cellular communication while starting the D2D communication. The registration process is performed via the PUSCH (steps, 1511 and 1512).

Each UE receives the beacon assignments from the eNB and the hash function which is used within a cell of the eNB to setup a beacon division region to a time/frequency/time-frequency domain according to the present invention, via the PDSCH (steps, 1521 and 1522). The PDSCH further includes resource information of the PUCCH and the PUSCH for performing the D2D discovery.

Herein, each UE obtains beacon for transmitting the UE information of its own through the broadcasted hash function. That is, each UE performs the UE information-beacon mapping. In addition, each UE may also obtain the information that the UE or the service that is going to communicate is transmitted from which beacon through the broadcasted hash function.

Then, the D2D UEs transmit the beacon region information calculated through the hash function using the PUSCH and the PUSCH allocated through the beacon information of its own, and receive the beacon that another UE transmits (step, 1530).

After transmitting and receiving the beacon, the UE verifies the possibility of whether the UE or the service that is going to be searched is within a range where the D2D communication is available (step, 1540). Preferentially, in order to check whether a UE that is going to be searched by its own exists in a cell, UE1 transmits a paging signal to UE2 which is possible via the PUCCH (step, 1550). Then, UE2 that receives the paging signal transmits response information in response to this (step, 1552).

UE1 may transmit a link setup message to UE2 via PUSCH, the setup message including the ID of a potential peer UE that is verified through the hash function, (step, 1554). UE2 transmits response information to the UE1 for setting up a link of its own with the peer UE according to the ID request included in PUSCH (step, 1556). UE 1 that receives the beacon transmits a link setup request message with the private security key to UE2 that transmitted the beacon. UE2 sets up a link transmitting an ACK in response to receiving the link setup message based on its own ID.

After that, the UE1 and the UE2 perform the transmission and reception of the data by the resource for the transmission of data being scheduled (step, 1580).

Figure 16:
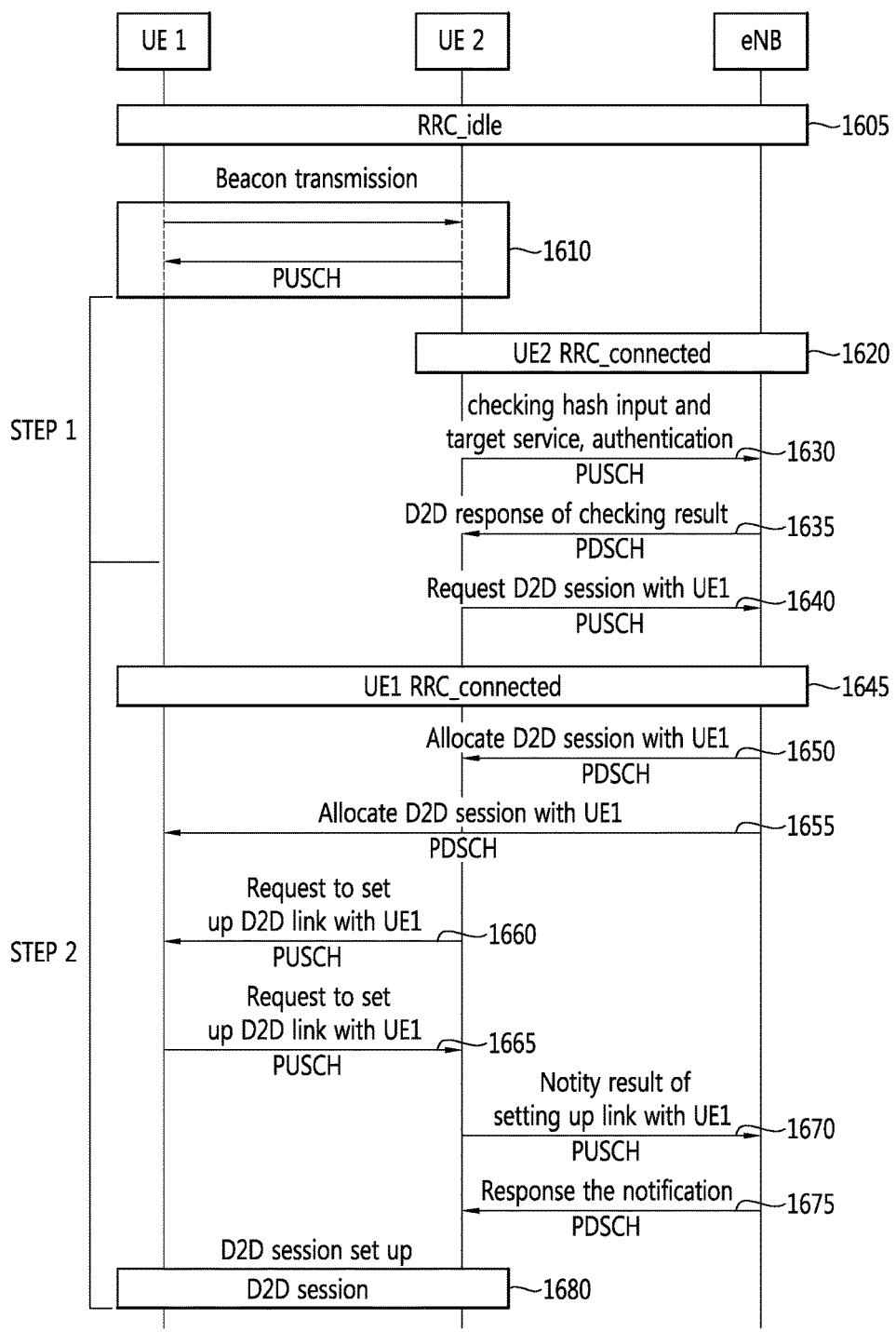
FIG. 16 is a flow chart of signaling that is schematically illustrating the D2D registration procedure according to the present invention.

FIG. 16 is a flow chart of signaling that is schematically illustrating the D2D registration procedure according to the present invention.

Referring to FIG. 16, a way of peer verification through an eNB is comprised of two steps including verifying whether each UE, which is going to be searched, exists in the eNB together with authenticating of the UE and later performing proximity verification of device and link formation.

Firstly, when turning on the power of a UE, the UE searches a suitable cell first and then stays in the corresponding cell in an RRC_idle state (step, 1605). The D2D UE transmits and receives a predetermined beacon signal for the D2D service in a predetermined time and frequency resources (step, 1610). In this time, in case that each UE that stays an RRC-idle state recognize a need for an RRC connection, it performs a RRC connection establishment procedure with the RRC of E-UTRAN and is transferred to an RRC_connected state (step, 1620).

The first step is verifying, by a random UE, whether a specific UE that is going to be searched by the random UE itself exists in a cell from a beacon of UE received by itself from the eNB. For example, UE2 receives the beacon of UE1, and is going to verify whether the UE of the corresponding beacon is the beacon of a UE that the UE2 itself is going to search for when the beacon information of the corresponding UE is identical to the beacon information of a UE that is going to be searched. UE2 requests whether the UE that is going to be searched for exists in the eNB and whether the beacons collides to an eNB with an authentication key of the corresponding UE and confirms this from the eNB. For this, the UE2 transmits PUSCH that includes the authentication for a peer UE and the beacon signal to the eNB considering the hash value for the received beacon signal, input and target service applied by the hash function that is applied in a cell.

Through this, the UE is able to know whether a UE that is searched for by the UE itself exists within a cell and whether to collide (step, 1635). The UE receives a D2D response for the result confirmed by PDSCH. In this time, if it is confirmed by the eNB that a UE that is searched for exists in a cell and that there is no collision occurred on the corresponding beacon with other UE, the UE gets to know that a UE of the corresponding beacon is the UE that is searched for by itself. However, even though the UE that is searched for exists in a cell but there occurred a collision of beacons, the UE is not able to verify that a UE is identical to the UE that is searched for. It is able to learn through the link setup procedure later.

The link setup process, which is the second step, is a step of verifying proximity between UEs and establishing link formation after successfully performing the first step. By the process, messages are directly exchanged with UEs for verifying the proximity between the UEs and the link situation. An eNB dynamically allocates resources to each UE and the UE that is going to be searched by the corresponding UE, and notifies this to the corresponding UEs. That is, at the request of the UE2 (step, 1640), the UE2 transmits a message requesting for the D2D session with the UE1 through PUSCH to an eNB, each UE is allocated from the eNB with the resource for exchanging the corresponding message through PDSCH. Here, the UE2 is in an RRC_connected state (step, 1645).

After that, messages are directly exchanged between UEs, the proximity and the link condition between UEs are confirmed (steps, 1660 and 1665), and then, the UE2 judges the probability of direct communications between UEs and informs it to the eNB (steps, 1670 and 1675). In this time, each UE transmits a request/response for the D2D link setup through PUSCH and notifies the result by the link setup between the UEs to an eNB.

In the first step, although the UE that is going to be searched is located in the cell, if the beacon collides, the UE is unable to know accurately whether the UE of the corresponding beacon is a UE that is going to be searched. However, by verifying the proximity of UE through whether the direct exchange with the corresponding UE is successful of the second step, whether the UE of the corresponding UE is the UE that is going to be searched may be verified. If the procedure of verifying the proximity of UE that is going to be searched and the link formation are successfully completed through the two steps, then D2D communication are performed.

Figure 17:
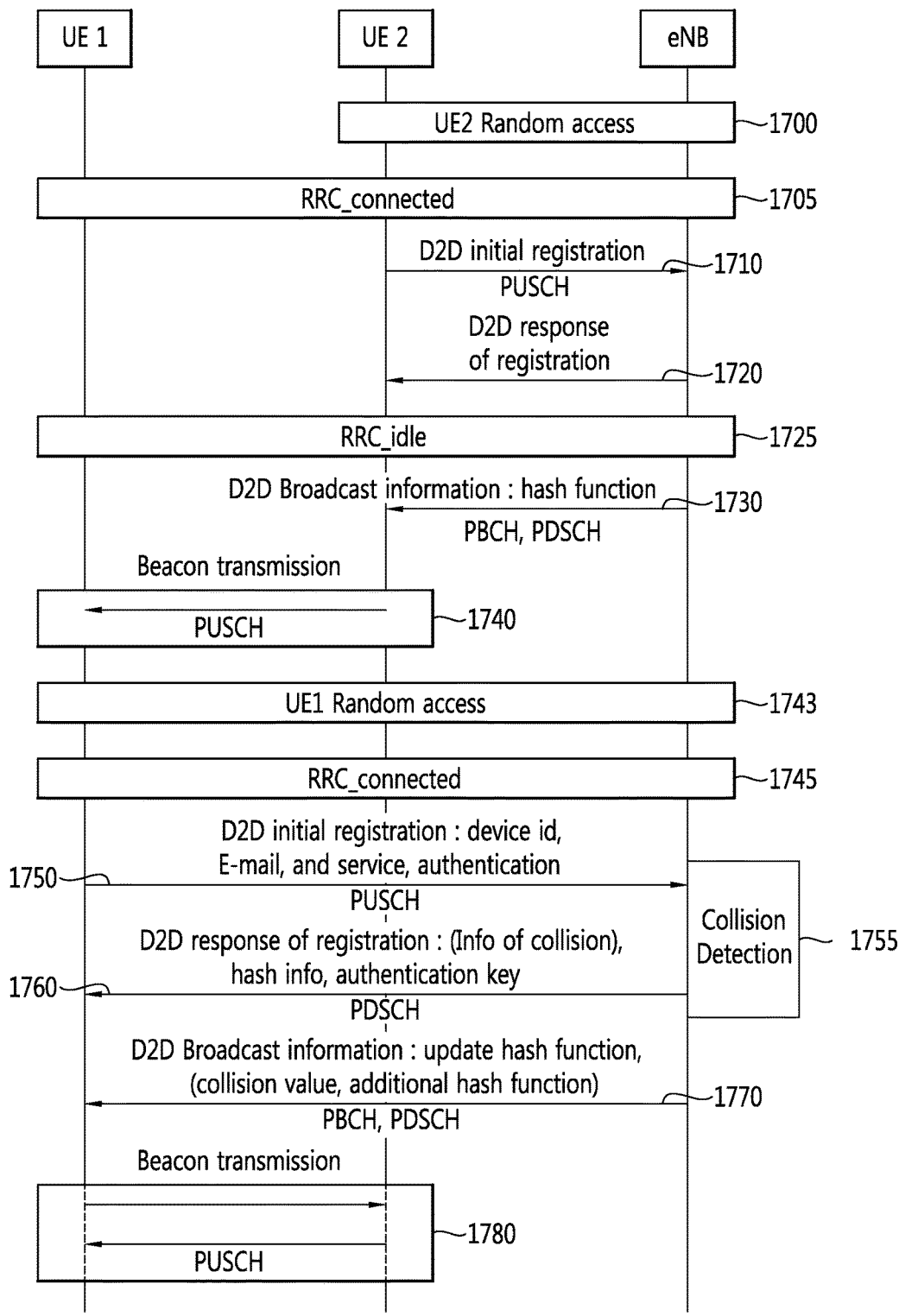
FIG. 17 is a signaling flowchart that illustrates the verification procedure of the D2D UE using a hash function through an eNB according to the present invention.

FIG. 17 is a signaling flowchart that illustrates the verification procedure of the D2D UE using a hash function through an eNB according to the present invention.

Referring to FIG. 17, the UE2 performs a random access procedure with an eNB for supporting the D2D service (step, 1700) and is converted to an RRC_connected state (step, 1705). Here, the RRC_connected state means that E-UTRAN has the information (context) of UE.

The UE2 transmits the D2D service initial registration message to an eNB through PUSCH in order to inform that D2D communication is available in the RRC_connected state to the eNB (step, 1710), and the eNB transmits the D2D initial registration response message to the corresponding UE through PDSCH (step, 1720).

Meanwhile, the UE2 is operated in DRX in order to save the power consumption of UE and transferred to an RRC_idle state (step, 1725). In this time, the UE1 and the UE2 that are in the RRC_idle state, periodically stand up to see paging a channel.

According to the present invention, the eNB broadcasts the broadcasting information that includes a hash function to the D2D UEs through PDSCH or PBCH for the peer discovery, which is made through a down link as well as the paging signal (step, 1730).

For this, the D2D UEs transmits and receives the beacon signal of a length determined in the beacon assignment partition, which is generated using the UE ID of its own and the received hash function, through PUSCH at the transmission timing of predetermined beacon signal (step, 1740). The beacon signal refers to a signal that is transmitted and received through predefined time and frequency resources for the peer discovery according to the present invention, and particularly, it is transmitted and received in variable resource (time, frequency, and time-frequency) domains depending on the UE information and hash function.

Meanwhile, the UE1 performs a random access procedure (step, 1743) and is transferred to an RRC_connected state (step, 1745).

The UE 1 transmits the UE identification information of its own, for example, e-mail address, telephone number, D2D dedicated ID, and the D2D service initial registration message that includes the authentication information to an eNB through PUSCH (step, 1750). The eNB, by a response of it, calculates whether to collide between beacons by using the hash function in a cell that is applied to the UE1, that is to say, judge whether the number of colliding UEs of beacon that is calculated by the hash function, i.e., the number of colliding UEs between specific beacons, is over the predetermined threshold value (step, 1755), and transmits the D2D initial registration response message, which includes a hash function through PDSCH, an authentication key based on the UE information for the D2D service, the information about the beacon collision calculated in an eNB, and the cycle of discovery number for the beacon collision, and so on to the UE1 (step, 1760).

After that, the eNB renews a hash function and broadcasts the D2D broadcasting information, which includes information about the calculated number of the UE collided of beacon, the added hash function and cycle, and so on, through PDSCH or PBCH (step, 1770).

For this, the D2D UEs transmits and receives the beacon signal of a length determined in the beacon assignment partition, which is newly generated using the UE ID of its own and the updated hash function, through PUSCH at the transmission timing of predetermined beacon signal (step, 1740). Accordingly, more accurate D2D peer discovery is available through the hash function renewed by an eNB in consideration of collision.

Figure 18:
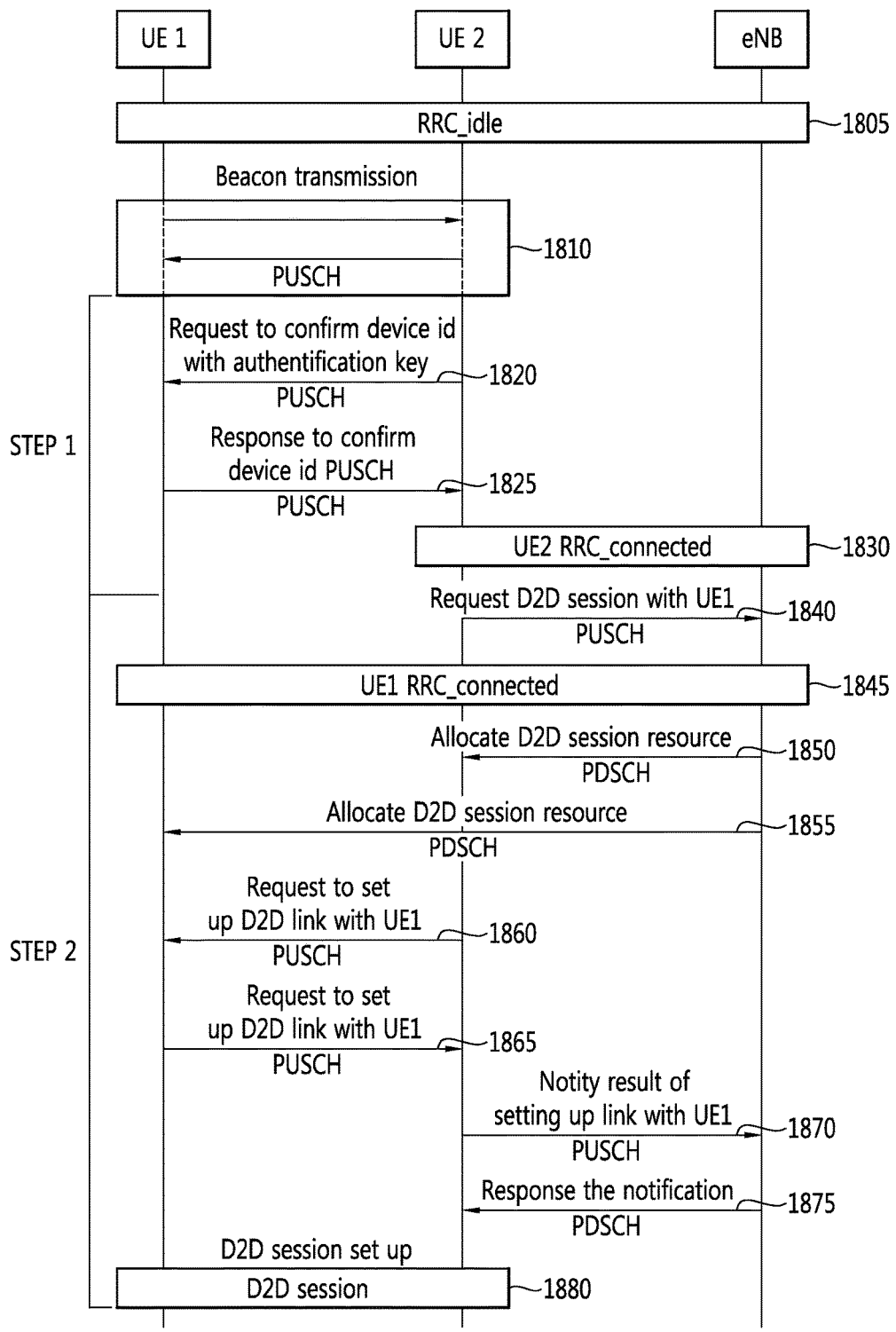
FIG. 18 is a signaling flowchart that illustrates the verification procedure of the D2D UE using a hash function between UEs according to the present invention.

FIG. 18 is a signaling flowchart that illustrates the verification procedure of the D2D UE using a hash function between UEs according to the present invention.

Referring to FIG. 18, the D2D UE of an RRC_idle state (step, 1805), transmits and receives the beacon signal predetermined in the predetermined time and frequency resources for the D2D service (step, 1810).

In the first step, a certain UE confirms whether a specific UE, which is expected to be searched, exists in a cell from the beacon of the UE that is received in the UE itself. For example, the UE2, in order to check of the coincidence between the beacon information of the corresponding UE1 and the beacon information of a UE that is searched by the UE2 itself by receiving the beacon of UE1, transmits the beacon of UE1 through PUSCH that includes an authentication key to the UE1 (step, 1820). After that, the UE2 receives PUSCH that includes a response message for confirmation of the encryption key from the UE1 (step, 1825).

In this time, the UE2 that stays in the RRC_idle state, is transferred to an RRC_connected state through the RRC connection setup procedure (step, 1830), and transmits a message for requesting the D2D session with the UE1 to an eNB through PUSCH (step, 1840). For this, the UE1 that stays in an RRC_idle state is transferred to an RRC_connected state through an RRC connection setup procedure (step, 1845), and the above UE1 and UE2 can be received from an eNB with resource assignment for the D2D service (steps, 1850 and 1855). The eNB allocates the resource that is used for a direct communication between UEs as well as the resource that is used for the exchange of the corresponding message to the corresponding UEs through PDSCH in the above procedure.

After that, messages are directly exchanged between UEs, the proximity and the link condition between UEs are confirmed (steps, 1860 and 1865), and then, the UE2 judges the probability of direct communications between UEs and informs it to the eNB (steps, 1870 and 1875). In this time, each UE transmits a request/response for the D2D link setup through PUSCH and notifies the result by the link setup between the UEs to an eNB. And then, data is transmitted and received through the D2D session (step, 1880).

Figure 19:
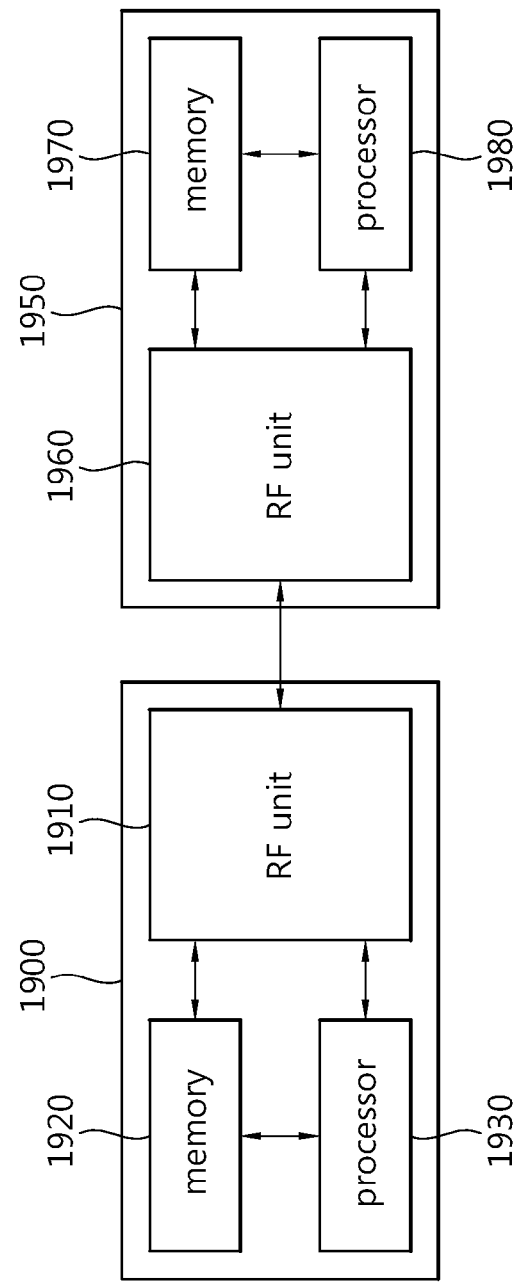
FIG. 19 schematically illustrates a structure of wireless communication system according to the present invention.

FIG. 19 schematically illustrates a structure of wireless communication system according to the present invention.

Referring to FIG. 19, a UE 1900 includes a radio frequency (RF) unit 1910, a memory 1920 and a processor 1930. The RF unit 1910 is connected with the processor 1930, and transmits/receives radio signals.

The processor 1930 is an entity to perform functions, processes, methods, and so on, and performs the operation for FIG. 1 to FIG. 18 of the present invention. Particularly, the processor 1930 according to the present invention may support simultaneous access or partial access of the D2D communication and the cellular communication according to the capacity of UE by receiving the configuration information and the resource allocation information indicated by a network, which is a higher system. In this time, the processor 1930 may search a UE that performs the D2D communication by receiving the hash function or the updated hash function transmitted via the PBCH or the PDSCH from an eNB, and may also perform the communication by configuring link with the searched UE.

Particularly, according to the present invention, the processor 1930 generates the information of assigned region of the beacon signals to perform the D2D discovery and the data bits which are to be included in the beacon signals by receiving the hash function which is applied within a cell. In this time, the identification information of each UE, which is going to transmit the beacon signals through the hash function, is represented by a beacon assignment region of a first length which is determined according to the application to time, frequency and time-frequency resource, in this time, the beacon assignment region may be represented to include resources of variable size by considering the service of D2D UE which is applied. In addition, among the remaining bit information after representing the beacon assignment region, predetermined information of 2 bits is controlled to be transmitted with being included in actual beacon signals. Herein, as the representation of hash value according to the application of hash function, MSB bit or LSB bit of hash value, or randomly configured bits may be used according to the rule with systems.

Accordingly, the processor 1930 verifies the peer of its own by checking the received beacon signals, that is, by checking the beacon signals in a predetermined beacon assignment region after applying the hash function to the received beacon signal. In this time, the hash function updated in the cell is received, and the beacon signals in which the collision is prevented through the updated hash function are transmitted and received.

Herein, the beacon signals transmitted and received according to the present invention is signals that include information indicating a beacon assignment region that indicates an assignment region of the corresponding UE and beacon signals of short length transmitted from the corresponding beacon assignment region, and effectively control load (complexity) for verifying the existing whole discovery region, that is, by transmitting and receiving the beacon signals of short length in the corresponding beacon division region, have advantages of acquiring discovery signal for rapidly and more effectively configuring the D2D link.

In addition, the processor 1930 verifies reliability for the D2D link configuration by checking ID of peer UE which is possible to be verified through the hash function to an eNB or to the peer UE. That is, whether the corresponding UE to setup the D2D link exists in a discovery range, or is a proper UE for performing the D2D link is checked through the eNB or directly.

Herein, the processor 1930 performs setup/release of D2D registration through different messages according to the RRC connected/idle state of UE, and acquires the hash function. In the present invention, it is described that the hash function is broadcasted information, but not limited thereto. In addition, the resource verification according to the present invention includes verifying information of resource allocation information of the PDCCH, the PDSCH, the PUSCH and the PUCCH.

As described above, the memory 1920 is connected with the processor 1930, and includes information for supporting all operations of the processor 1930.

Meanwhile, a network 1950 includes a radio frequency (RF) unit 1960, a processor 1980 and a memory 1970. The RF unit 1910 is connected with the processor 1980, and transmits/receives radio signals. Herein, the network may be configured in a form that a part of entity of the eNB and a part of entity of the higher core network are partially supported according to the operation.

The processor 1980 of the network according the present invention is an entity to perform functions, processes, methods, and so on, and performs the operation for FIG. 1 to FIG. 18 of the present invention. That is, the resource allocation is performed by considering capacity information, service state, channel state, etc. of UEs in a cell. Particularly, according to the present invention, the resources may be allocated by distinguishing the resource for the D2D communication and the subframe for the cellular communication. In addition, according to the present invention, the hash function for the D2D group may be setup. Additionally, the cycle for applying the hash function, etc. may be changed or updated by calculating and verifying the collision of UEs that transmit and receive the beacon signals. In addition, the information of the hash function and updated hash function, the changed hash function and collision, etc. is transmitted to the UE via the PDSCH, the PBCH or the PMCH.

In addition, by considering the RRC state of UE, the RRC connection setup procedure may be performed or the D2D discovery service may be released through the handover or the tracking area update procedure according to the request of UE. In addition, the present invention provides information of DRX configuration to the D2D UE. Accordingly, the corresponding UEs may properly receive the allocated resources by transmitting the PDCCH at a predetermined timing. Herein, the resource includes resources for the D2D service and the PUCCH and the PUSCH for the cellular service.

The memory 1970 is connected with the processor 1980, and includes information for supporting all operations of the processor 1980.

So far, the present invention has been described by reference to the drawings and the embodiments as an example, and it should be understood by those skilled in the art, however, that the present invention can be modified or changed in various ways without departing from the technical principles and scope. Accordingly, the embodiments disclosed in the present invention are not intended to limit the scope of the inventive concept of the present invention, but to describe, and the scope of the inventive concept of the present invention is not limited to the embodiment. The scope of the present invention should be interpreted by the claims below, and it should be interpreted that all inventive concepts within the equivalent scope are included in the scope of the present invention.

What is claimed is:

1. A method for device-to-device (D2D) communication in a wireless communication system, the method comprising:
    receiving, by a first user equipment (UE), broadcast information from a base station (BS), wherein the broadcast information includes at least one hash parameter and a second identifier (ID) of a second UE;
    generating, by the first UE, a first discovery ID by applying the at least one hash parameter to a first ID of the first UE, wherein a bit length of the first discovery ID is shorter than a bit length of the first ID of the first UE;
    configuring, by the first UE, a first part of the first discovery ID to indicate at least one first resource region and configuring a second part of the first discovery ID for inclusion in a first beacon signal; and
    transmitting, by the first UE, the first beacon signal via the at least one first resource region to perform the D2D communication with the second UE.

2. The method of claim 1, further comprising:
    receiving, by the first UE, a second beacon signal from the second UE via at least one second resource region,
    wherein the at least one second resource region is indicated by a first part of a second discovery ID that is obtained by applying the at least one hash parameter to the second ID, and
    wherein the at least one first resource region and the at least one second resource region are a portion of available time and frequency resources for the BS.

3. The method of claim 1, wherein generating the first discovery ID comprises:
    applying a first hash parameter corresponding to the first ID of the first UE, applying a second hash parameter corresponding to a service requested by the first UE, or applying a third hash parameter corresponding to both the first ID of the first UE and the service of the first UE.

4. The method of claim 1, further comprising:
    registering, by the first UE, the first ID of the first UE with the BS; and
    receiving, by the first UE, broadcast information including an updated hash parameter for avoiding collision between the first UE and the second UE from the BS,
    wherein the updated hash parameter is received via a physical broadcast channel (PBCH) or a physical downlink shared channel (PDSCH).

5. The method of claim 4, wherein the updated hash parameter is generated by:
    identifying a number of UE that collide with a specific beacon signal;
    determining whether the identified number of UE exceeds a predetermined threshold value; and
    converting the received updated hash parameter to a hash parameter that has a cycle N.

6. The method of claim 4 further comprising:
    acquiring a hash value mapped to the first ID of the first UE by applying the received updated hash parameter; and
    generating the first beacon signal by verifying the acquired hash value.

7. The method of claim 4, wherein:
    registering the first ID of the first UE comprises transmitting unique identification information of the first UE to the BS; and
    wherein the unique identification information includes at least one of a mail address, a MAC address, a phone number or a D2D dedicated ID.

8. The method of claim 1 further comprising:
    verifying whether the second UE is a peer UE of the first UE for performing the D2D communication by checking a second beacon signal or checking whether the second UE exists within a range where the D2D communication is available.

9. The method of claim 8, wherein verifying whether the second UE is the peer UE comprises:
    transmitting a D2D link configuration request message including an ID of a verified peer UE to the BS via a physical uplink shared channel (PUSCH); and
    receiving a D2D link configuration response message from the BS via a physical downlink shared channel (PDSCH), wherein the response message includes information for the ID of the verified peer UE.

10. The method of claim 8, wherein verifying whether the second UE is the peer UE comprises:
    transmitting a paging message to a verified peer UE via a physical uplink control channel (PUCCH) in order to verify whether the verified peer UE exists within a cell;
    receiving a response to the paging message via the PUCCH from the verified peer UE;
    transmitting a D2D link configuration request message including an ID of the verified peer UE to the verified peer UE via a physical uplink shared channel (PUSCH); and receiving a D2D link configuration response message from the verified peer UE via the PUSCH, wherein the response message includes information for the ID of the verified peer UE.

11. A first user equipment (UE) for device-to-device (D2D) communication service in a wireless communication system, the UE comprising:
a radio frequency (RF) unit configured to transmit and receive radio signals; and
a processor connected to the RF unit and configured to:
control the RF unit to receive broadcast information from a base station (BS), wherein the broadcast information includes at least one hash parameter and a second identifier (ID) of a second UE;
generate a first discovery ID by applying the at least one hash parameter to a first ID of the first UE, wherein a bit length of the first discovery ID is shorter than a bit length of the first ID of the first UE;
configure a first part of the first discovery ID to indicate at least one first resource region and configure a second part of the first discovery ID for inclusion in a first beacon signal; and
transmit the first beacon signal via the at least one first resource region to perform the D2D communication with the second UE.

12. The first UE of claim 11, wherein:
the processor is further configured to control the RF unit to receive a second beacon signal from the second UE via at least one second resource;
the at least one second resource region is indicated by a first part of a second discovery ID that is obtained by applying the at least one hash parameter to the second ID; and
the at least one first resource region and the at least one second resource region are a portion of available time and frequency resources for the BS.

13. The first UE of claim 11, wherein:
the processor is further configured to apply a first hash parameter corresponding to the first ID of the first UE, apply a second hash parameter corresponding to a service requested by the first UE, or apply a third hash parameter corresponding to both the first ID of the first UE and the service of the first UE.

14. The first UE of claim 11, wherein:
the processor is further configured to register the first ID of the first UE with the BS;
the processor is further configured to control the RF unit to receive broadcast information including an updated hash parameter for avoiding collision between the first UE and the second UE from the BS; and
the updated hash parameter is received via a physical broadcast channel (PBCH) or a physical downlink shared channel (PDSCH).

15. The first UE of claim 14, wherein the updated hash parameter is generated by:
identifying a number of UE that collide with a specific beacon signal;
determining whether the identified number of UE exceeds a predetermined threshold value; and
converting the received updated hash parameter to a hash parameter that has a cycle N.

16. The first UE of claim 14 wherein the processor is further configured to:
acquire a hash value mapped to the ID of the first UE by applying the received updated hash parameter; and
generate the first beacon signal by verifying the acquired hash value.

17. The first UE of claim 14, wherein:
registering the first ID of the first UE comprises transmitting unique identification information of the first UE to the BS; and
the unique identification information includes at least a mail address, a MAC address, a phone number or a D2D dedicated ID.

18. The first UE of claim 11, wherein the processor is further configured to:
verify whether the second UE is a peer UE of the first UE for performing the D2D communication by checking a second beacon signal or checking whether the second UE exists within a range where the D2D communication is available.

19. The first UE of claim 18, wherein verifying whether the second UE is the peer UE comprises:
transmitting a D2D link configuration request message including an ID of a verified peer UE to the BS via a physical uplink shared channel (PUSCH); and
receiving a D2D link configuration response message from the BS via a physical downlink shared channel (PDSCH), the response message including response information for the ID of the verified peer UE.

20. The first UE of claim 18, wherein verifying whether the second UE is the peer UE comprises:
transmitting a paging message to a verified peer UE via a physical uplink control channel (PUCCH) in order to verify whether the verified peer UE exists within a cell;
receiving a response to the paging message via the PUCCH from the verified peer UE;
transmitting a D2D link configuration request message including an ID of the verified peer UE to the verified peer UE via a physical uplink shared channel (PUSCH); and
receiving a D2D link configuration response message from the verified peer UE via the PUSCH, the response message including information for the ID of the verified peer UE.

* * * * *